US012421169B2

(12) United States Patent
Thomas et al.

(10) Patent No.: US 12,421,169 B2
(45) Date of Patent: *Sep. 23, 2025

(54) CARBONATION OF CONCRETE AGGREGATES

(71) Applicant: CARBONCURE TECHNOLOGIES INC., Dartmouth (CA)

(72) Inventors: Michael Thomas, Buckhorn (CA); George Sean Monkman, Halifax (CA); Alex Hanmore, Halifax (CA); Dean Paul Forgeron, Hacketts Cove (CA)

(73) Assignee: CARBONCURE TECHNOLOGIES INC., Dartmouth (CA)

( * ) Notice: Subject to any disclaimer, the term of this patent is extended or adjusted under 35 U.S.C. 154(b) by 479 days.

This patent is subject to a terminal disclaimer.

(21) Appl. No.: 17/606,415

(22) PCT Filed: Apr. 27, 2020

(86) PCT No.: PCT/IB2020/053953
§ 371 (c)(1),
(2) Date: Oct. 25, 2021

(87) PCT Pub. No.: WO2020/217232
PCT Pub. Date: Oct. 29, 2020

(65) Prior Publication Data
US 2022/0194852 A1    Jun. 23, 2022

Related U.S. Application Data

(60) Provisional application No. 62/865,898, filed on Jun. 24, 2019, provisional application No. 62/839,303, filed on Apr. 26, 2019.

(51) Int. Cl.
| C04B 18/167 | (2023.01) |
| B28C 5/38 | (2006.01) |
| C04B 28/02 | (2006.01) |
| C04B 40/02 | (2006.01) |

(52) U.S. Cl.
CPC .......... *C04B 18/167* (2013.01); *B28C 5/388* (2013.01); *C04B 28/02* (2013.01); *C04B 40/0231* (2013.01)

(58) Field of Classification Search
CPC ................................................ C04B 40/0231
See application file for complete search history.

(56) References Cited

U.S. PATENT DOCUMENTS

| 128,980 A | 7/1872 | Rowland |
| 170,594 A | 11/1875 | Richardson |
| 461,888 A | 10/1891 | Richardson |
| 1,932,150 A | 10/1933 | Tada |
| 2,254,016 A | 8/1941 | Melton et al. |
| 2,259,830 A | 10/1941 | Osborne |
| 2,329,940 A | 9/1943 | Ponzer |
| 2,496,895 A | 2/1950 | Staley |
| 2,498,513 A | 2/1950 | Cuypers |
| 2,603,352 A | 7/1952 | Tromp |
| 3,002,248 A | 10/1961 | Willson |
| 3,184,037 A | 5/1965 | Greaves et al. |
| 3,356,779 A | 12/1967 | Schulze |
| 3,358,342 A | 12/1967 | Spence |
| 3,442,498 A | 5/1969 | Noah |
| 3,468,993 A | 9/1969 | Knud |
| 3,492,385 A | 1/1970 | Branko |
| 3,667,242 A | 6/1972 | Robert |
| 3,752,314 A | 8/1973 | Brown et al. |
| 3,757,631 A | 9/1973 | McManus et al. |
| 3,917,236 A | 11/1975 | Hanson |
| 3,957,203 A | 5/1976 | Bullard |
| 3,976,445 A | 8/1976 | Douglas et al. |
| 4,068,755 A | 1/1978 | Parkes et al. |
| 4,069,063 A | 1/1978 | Ball |
| 4,076,782 A | 2/1978 | Yazawa et al. |
| 4,093,690 A | 6/1978 | Murray |
| 4,111,671 A | 9/1978 | Williamson |
| 4,117,060 A | 9/1978 | Murray |
| 4,257,710 A | 3/1981 | Delcoigne et al. |
| 4,266,921 A | 5/1981 | Murray |
| 4,275,836 A | 6/1981 | Egger |
| 4,350,567 A | 9/1982 | Moorehead et al. |
| 4,362,679 A | 12/1982 | Malinowski |
| 4,375,755 A | 3/1983 | Barbini et al. |

(Continued)

FOREIGN PATENT DOCUMENTS

| AT | 388369 B | 11/1998 |
| AU | 2397377 A | 10/1978 |

(Continued)

OTHER PUBLICATIONS

Office Action for Chilean Application No. 03376-2020 dated Nov. 18, 2021, 34 pages.
Ozcan et al., "Process integration of a Ca-looping carbon capture process in a cement plant", International Journal of Greenhouse Gas Control, 2013, vol. 19, pp. 530-540. https://doi.org/10.1016/j.ijggc.2013.10.009).
Republic of Columbia [translation]; First Exam Report for No. NC2021/0009084, dated Aug. 5, 2022, 13 pages.
Shi et al. "Performance Enhancement of Recycled Concrete Aggregate—A Review," Journal of Cleaner Production, 112, pp. 466-472 (2006).
Singapore, Invitation to Respond to Written Opinion for Application No. 11221062015, dated Oct. 18, 2022, 2 pages.

(Continued)

*Primary Examiner* — Stuart L Hendrickson
(74) *Attorney, Agent, or Firm* — Storella & Witt, LLP

(57) ABSTRACT

Provided herein are methods and compositions for carbonation of recycled concrete aggregates (RCA) to produce carbonated RCA. In addition, uses of the carbonated RCA, such as in building materials, and building materials containing RCA, are included. Carbonation of RCA may be used alone or may be used in combination with other carbonation processes associated with concrete manufacture, such as carbonation of wet concrete mixes and/or carbonation of concrete wash water.

26 Claims, 7 Drawing Sheets

(56) References Cited

U.S. PATENT DOCUMENTS

| | | | |
|---|---|---|---|
| 4,420,868 A | 12/1983 | McEwen et al. | |
| 4,427,610 A | 1/1984 | Murray | |
| 4,436,498 A | 3/1984 | Murray | |
| 4,444,023 A | 4/1984 | Barbini et al. | |
| 4,526,534 A | 7/1985 | Wollmann | |
| 4,588,299 A | 5/1986 | Brown et al. | |
| 4,609,303 A | 9/1986 | Shumaker | |
| 4,613,472 A | 9/1986 | Svanholm | |
| 4,746,481 A | 5/1988 | Schmidt | |
| 4,772,439 A | 9/1988 | Trevino-Gonzalez | |
| 4,789,244 A | 12/1988 | Dunton et al. | |
| 4,846,580 A | 7/1989 | Oury | |
| 4,881,347 A | 11/1989 | Mario et al. | |
| 4,917,587 A | 4/1990 | Alpar et al. | |
| 4,944,595 A | 7/1990 | Hodson | |
| 5,051,217 A | 9/1991 | Alpar et al. | |
| 5,125,979 A | 6/1992 | Swain et al. | |
| 5,141,363 A | 8/1992 | Stephens | |
| 5,158,996 A | 10/1992 | Valenti | |
| 5,162,402 A | 11/1992 | Ogawa et al. | |
| 5,203,919 A | 4/1993 | Bobrowski et al. | |
| 5,220,732 A | 6/1993 | Lee | |
| 5,232,496 A | 8/1993 | Jennings et al. | |
| 5,244,498 A | 9/1993 | Steinke | |
| 5,257,464 A | 11/1993 | Trevino-Gonzales | |
| 5,298,475 A | 3/1994 | Shibata et al. | |
| 5,352,035 A | 10/1994 | Macaulay et al. | |
| 5,356,579 A | 10/1994 | Jennings et al. | |
| 5,358,566 A | 10/1994 | Tanaka et al. | |
| 5,360,660 A | 11/1994 | Nohlgren | |
| 5,393,343 A | 2/1995 | Darwin et al. | |
| 5,419,632 A | 5/1995 | Stephens | |
| 5,427,617 A | 6/1995 | Bobrowski et al. | |
| 5,453,123 A | 9/1995 | Burge et al. | |
| 5,458,470 A | 10/1995 | Mannhart et al. | |
| 5,494,516 A | 2/1996 | Drs et al. | |
| 5,505,987 A | 4/1996 | Jennings et al. | |
| 5,518,540 A | 5/1996 | Jones, Jr. | |
| 5,556,033 A | 9/1996 | Nachtman | |
| 5,583,183 A | 12/1996 | Darwin et al. | |
| 5,609,681 A | 3/1997 | Drs et al. | |
| 5,612,396 A | 3/1997 | Valenti et al. | |
| 5,624,493 A | 4/1997 | Wagh et al. | |
| 5,633,298 A | 5/1997 | Arfaei et al. | |
| 5,643,978 A | 7/1997 | Darwin et al. | |
| 5,650,562 A | 7/1997 | Jones, Jr. | |
| 5,660,626 A | 8/1997 | Ohta et al. | |
| 5,661,206 A | 8/1997 | Tanaka et al. | |
| 5,665,158 A | 9/1997 | Darwin et al. | |
| 5,667,298 A | 9/1997 | Musil et al. | |
| 5,668,195 A | 9/1997 | Leikauf | |
| 5,669,968 A | 9/1997 | Kobori et al. | |
| 5,674,929 A | 10/1997 | Melbye | |
| 5,676,905 A | 10/1997 | Andersen et al. | |
| 5,690,729 A | 11/1997 | Jones, Jr. | |
| 5,703,174 A | 12/1997 | Arfaei et al. | |
| 5,725,657 A | 3/1998 | Darwin et al. | |
| 5,728,207 A | 3/1998 | Arfaei et al. | |
| 5,744,078 A | 4/1998 | Soroushian et al. | |
| 5,752,768 A | 5/1998 | Assh | |
| 5,753,744 A | 5/1998 | Darwin et al. | |
| 5,798,425 A | 8/1998 | Albrecht et al. | |
| 5,800,752 A | 9/1998 | Charlebois | |
| 5,803,596 A | 9/1998 | Stephens | |
| 5,804,175 A | 9/1998 | Ronin et al. | |
| 5,840,114 A | 11/1998 | Jeknavorian et al. | |
| 5,873,653 A | 2/1999 | Paetzold | |
| 5,882,190 A | 3/1999 | Doumet | |
| 5,885,478 A | 3/1999 | Montgomery et al. | |
| 5,912,284 A | 6/1999 | Hirata et al. | |
| 5,916,246 A * | 6/1999 | Viegas | F17C 5/02 62/50.1 |
| 5,935,317 A | 8/1999 | Soroushian et al. | |
| 5,944,359 A | 8/1999 | Andronaco | |
| 5,947,600 A | 9/1999 | Maeda et al. | |
| 5,965,201 A | 10/1999 | Jones, Jr. | |
| 6,008,275 A | 12/1999 | Moreau et al. | |
| 6,023,941 A | 2/2000 | Rhoades | |
| 6,042,258 A | 3/2000 | Hines et al. | |
| 6,042,259 A | 3/2000 | Hines et al. | |
| 6,063,184 A | 5/2000 | Leikauf et al. | |
| 6,066,262 A | 5/2000 | Montgomery et al. | |
| 6,113,684 A | 9/2000 | Kunbargi | |
| 6,136,950 A | 10/2000 | Vickers, Jr. et al. | |
| 6,151,913 A | 11/2000 | Lewis et al. | |
| 6,173,916 B1 | 1/2001 | Krone-Schmidt | |
| 6,187,841 B1 | 2/2001 | Tanaka et al. | |
| 6,264,736 B1 | 7/2001 | Knopf et al. | |
| 6,267,494 B1 | 7/2001 | Burch | |
| 6,267,814 B1 | 7/2001 | Bury et al. | |
| 6,284,867 B1 | 9/2001 | Vickers, Jr. et al. | |
| 6,290,770 B1 | 9/2001 | Moreau et al. | |
| 6,310,143 B1 | 10/2001 | Vickers, Jr. et al. | |
| 6,318,193 B1 | 11/2001 | Brock et al. | |
| 6,334,895 B1 | 1/2002 | Bland | |
| 6,372,157 B1 | 4/2002 | Krill, Jr. et al. | |
| 6,387,174 B2 | 5/2002 | Knopf et al. | |
| 6,418,948 B1 | 7/2002 | Harmon | |
| 6,451,105 B1 | 9/2002 | Turpin, Jr. | |
| 6,463,958 B1 | 10/2002 | Schwing | |
| 6,517,631 B2 | 2/2003 | Bland | |
| 6,648,551 B1 | 11/2003 | Taylor | |
| 6,682,655 B2 | 1/2004 | Beckham et al. | |
| 6,871,667 B2 | 3/2005 | Schwing et al. | |
| 6,890,497 B2 | 5/2005 | Rau et al. | |
| 6,936,098 B2 | 8/2005 | Ronin | |
| 6,960,311 B1 | 11/2005 | Mirsky et al. | |
| 6,997,045 B2 | 2/2006 | Wallevik et al. | |
| 7,003,965 B2 | 2/2006 | Auer et al. | |
| 7,201,018 B2 | 4/2007 | Gershtein et al. | |
| 7,390,444 B2 | 6/2008 | Ramme et al. | |
| 7,399,378 B2 | 7/2008 | Edwards et al. | |
| 7,419,051 B2 | 9/2008 | Damkjaer et al. | |
| 7,549,493 B1 | 6/2009 | Jones | |
| 7,588,661 B2 | 9/2009 | Edwards et al. | |
| 7,635,434 B2 | 12/2009 | Mickelson et al. | |
| 7,704,349 B2 | 4/2010 | Edwards et al. | |
| 7,735,274 B2 | 6/2010 | Constantz et al. | |
| 7,736,430 B2 | 6/2010 | Barron et al. | |
| 7,771,684 B2 | 8/2010 | Constantz et al. | |
| 7,815,880 B2 | 10/2010 | Constantz et al. | |
| 7,879,146 B2 | 2/2011 | Raki et al. | |
| 7,906,086 B2 | 3/2011 | Comrie | |
| 7,914,685 B2 | 3/2011 | Constantz et al. | |
| 7,922,809 B1 | 4/2011 | Constantz et al. | |
| 7,950,841 B2 | 5/2011 | Klein et al. | |
| 7,966,250 B2 | 6/2011 | Constantz et al. | |
| 8,006,446 B2 | 8/2011 | Constantz et al. | |
| 8,043,426 B2 | 10/2011 | Mohamed et al. | |
| 8,105,558 B2 | 1/2012 | Comrie | |
| 8,114,214 B2 | 2/2012 | Constantz et al. | |
| 8,114,367 B2 | 2/2012 | Riman et al. | |
| 8,118,473 B2 | 2/2012 | Cooley et al. | |
| 8,137,455 B1 | 3/2012 | Constantz et al. | |
| 8,157,009 B2 | 4/2012 | Patil et al. | |
| 8,177,909 B2 | 5/2012 | Constantz et al. | |
| 8,192,542 B2 | 6/2012 | Virtanen | |
| 8,235,576 B2 | 8/2012 | Klein et al. | |
| 8,272,205 B2 | 9/2012 | Estes et al. | |
| 8,287,173 B2 | 10/2012 | Khouri | |
| 8,311,678 B2 | 11/2012 | Koehler et al. | |
| 8,313,802 B2 | 11/2012 | Riman et al. | |
| 8,333,944 B2 | 12/2012 | Constantz et al. | |
| 8,470,275 B2 | 6/2013 | Constantz et al. | |
| 8,491,858 B2 | 7/2013 | Seeker et al. | |
| 8,503,596 B2 | 8/2013 | Sheets | |
| 8,518,176 B2 | 8/2013 | Silva et al. | |
| 8,584,864 B2 | 11/2013 | Lee et al. | |
| 8,708,547 B2 | 4/2014 | Bilger | |
| 8,709,960 B2 | 4/2014 | Riman et al. | |
| 8,721,784 B2 | 5/2014 | Riman et al. | |
| 8,746,954 B2 | 6/2014 | Cooley et al. | |
| 8,845,940 B2 | 9/2014 | Niven et al. | |
| 8,989,905 B2 | 3/2015 | Sostaric et al. | |

(56) References Cited

U.S. PATENT DOCUMENTS

| | | |
|---|---|---|
| 9,028,607 B2 | 5/2015 | Ramme |
| 9,061,940 B2 | 6/2015 | Chen et al. |
| 9,108,803 B2 | 8/2015 | Till |
| 9,108,883 B2 | 8/2015 | Forgeron et al. |
| 9,376,345 B2 | 6/2016 | Forgeron et al. |
| 9,388,072 B1 | 7/2016 | Niven et al. |
| 9,429,558 B2 | 8/2016 | Boncan et al. |
| 9,448,094 B2 | 9/2016 | Downie et al. |
| 9,463,580 B2 | 10/2016 | Forgeron et al. |
| 9,492,945 B2 | 11/2016 | Niven et al. |
| 9,738,562 B2 | 8/2017 | Monkman et al. |
| 9,758,437 B2 | 9/2017 | Forgeron et al. |
| 9,790,131 B2 | 10/2017 | Lee et al. |
| 10,246,379 B2 | 4/2019 | Niven et al. |
| 10,350,787 B2 | 7/2019 | Forgeron et al. |
| 10,392,305 B2 | 8/2019 | Wang et al. |
| 10,570,064 B2 | 2/2020 | Monkman et al. |
| 10,654,191 B2 | 5/2020 | Niven et al. |
| 10,683,237 B2 | 6/2020 | Lee et al. |
| 10,927,042 B2 | 2/2021 | Monkman et al. |
| 11,072,091 B1 | 7/2021 | Falco |
| 11,090,700 B1 | 8/2021 | Camell |
| 11,660,779 B2 | 5/2023 | Monkman et al. |
| 11,773,019 B2 | 10/2023 | Monkman et al. |
| 11,773,031 B2 | 10/2023 | Forgeron et al. |
| 11,878,948 B2 | 1/2024 | Monkman et al. |
| 11,958,212 B2 | 4/2024 | Monkman et al. |
| 2002/0019459 A1 | 2/2002 | Albrecht et al. |
| 2002/0047225 A1 | 4/2002 | Bruning et al. |
| 2002/0179119 A1 | 12/2002 | Harmon |
| 2003/0070448 A1 | 4/2003 | Gasteyer et al. |
| 2003/0122273 A1 | 7/2003 | Fifield |
| 2005/0131600 A1 | 6/2005 | Quigley et al. |
| 2005/0219938 A1 | 10/2005 | Rigaudon et al. |
| 2005/0219939 A1 | 10/2005 | Christenson et al. |
| 2007/0114178 A1 | 5/2007 | Coppola et al. |
| 2007/0170119 A1 | 7/2007 | Mickelson et al. |
| 2007/0171764 A1 | 7/2007 | Klein et al. |
| 2007/0185636 A1 | 8/2007 | Cooley et al. |
| 2007/0215353 A1 | 9/2007 | Barron et al. |
| 2008/0092957 A1 | 4/2008 | Rosaen |
| 2008/0174041 A1 | 7/2008 | Firedman et al. |
| 2008/0183523 A1 | 7/2008 | Dikeman |
| 2008/0202389 A1 | 8/2008 | Hojaji et al. |
| 2008/0245274 A1 | 10/2008 | Ramme |
| 2008/0264872 A1 | 10/2008 | Konishi et al. |
| 2008/0275149 A1 | 11/2008 | Ladely et al. |
| 2008/0308133 A1 | 12/2008 | Grubb et al. |
| 2008/0316856 A1 | 12/2008 | Cooley et al. |
| 2009/0044832 A1 | 2/2009 | Leonardich et al. |
| 2009/0093328 A1 | 4/2009 | Dickinger et al. |
| 2009/0103392 A1 | 4/2009 | Bilger |
| 2009/0143211 A1 | 6/2009 | Riman et al. |
| 2009/0292572 A1 | 11/2009 | Alden et al. |
| 2009/0294079 A1 | 12/2009 | Edwards et al. |
| 2010/0086983 A1 | 4/2010 | Gellett et al. |
| 2010/0132556 A1 | 6/2010 | Constantz et al. |
| 2010/0239487 A1 | 9/2010 | Constantz et al. |
| 2010/0246312 A1 | 9/2010 | Welker et al. |
| 2011/0023659 A1 | 2/2011 | Nguyên et al. |
| 2011/0067600 A1 | 3/2011 | Constantz et al. |
| 2011/0165400 A1 | 7/2011 | Quaghebeur et al. |
| 2011/0198369 A1 | 8/2011 | Klein et al. |
| 2011/0249527 A1 | 10/2011 | Seiler et al. |
| 2011/0262328 A1 | 10/2011 | Wijmans et al. |
| 2011/0277670 A1 | 11/2011 | Self et al. |
| 2011/0281333 A1 | 11/2011 | Brown et al. |
| 2011/0289901 A1 | 12/2011 | Estes et al. |
| 2011/0303551 A1 | 12/2011 | Gilliam et al. |
| 2011/0320040 A1 | 12/2011 | Koehler et al. |
| 2012/0031303 A1 | 2/2012 | Constantz et al. |
| 2012/0111236 A1 | 5/2012 | Constantz et al. |
| 2012/0152153 A1 | 6/2012 | Gong et al. |
| 2012/0153153 A1 | 6/2012 | Chang et al. |
| 2012/0238006 A1 | 9/2012 | Gartner et al. |
| 2012/0290208 A1 | 11/2012 | Jiang et al. |
| 2012/0298011 A1 | 11/2012 | Silva et al. |
| 2012/0312194 A1 | 12/2012 | Riman et al. |
| 2013/0025317 A1 | 1/2013 | Terrien et al. |
| 2013/0036945 A1 | 2/2013 | Constantz et al. |
| 2013/0104778 A1 | 5/2013 | Lisowski et al. |
| 2013/0122267 A1 | 5/2013 | Riman et al. |
| 2013/0125791 A1 | 5/2013 | Fried et al. |
| 2013/0139727 A1 | 6/2013 | Constantz et al. |
| 2013/0167756 A1 | 7/2013 | Chen et al. |
| 2013/0284073 A1 | 10/2013 | Gartner |
| 2013/0305963 A1 | 11/2013 | Fridman |
| 2014/0034452 A1 | 2/2014 | Lee et al. |
| 2014/0050611 A1 | 2/2014 | Warren et al. |
| 2014/0069302 A1 | 3/2014 | Saastamoinen et al. |
| 2014/0083514 A1 | 3/2014 | Ding |
| 2014/0090415 A1 | 4/2014 | Reddy et al. |
| 2014/0096704 A1 | 4/2014 | Rademan et al. |
| 2014/0104972 A1 | 4/2014 | Roberts et al. |
| 2014/0107844 A1 | 4/2014 | Koehler et al. |
| 2014/0116295 A1 | 5/2014 | Niven et al. |
| 2014/0127450 A1 | 5/2014 | Riman et al. |
| 2014/0197563 A1 | 7/2014 | Niven et al. |
| 2014/0208782 A1 | 7/2014 | Joensson et al. |
| 2014/0212941 A1 | 7/2014 | Lee |
| 2014/0216303 A1 | 8/2014 | Lee et al. |
| 2014/0327168 A1 | 11/2014 | Niven et al. |
| 2014/0373755 A1 | 12/2014 | Forgeron et al. |
| 2015/0023127 A1 | 1/2015 | Chon et al. |
| 2015/0069656 A1 | 3/2015 | Bowers et al. |
| 2015/0197447 A1 | 7/2015 | Forgeron et al. |
| 2015/0202579 A1 | 7/2015 | Richardson et al. |
| 2015/0232381 A1 | 8/2015 | Niven et al. |
| 2015/0247212 A1 | 9/2015 | Sakaguchi et al. |
| 2015/0274537 A1 | 10/2015 | Myers et al. |
| 2015/0298351 A1 | 10/2015 | Beaupré |
| 2015/0345034 A1 | 12/2015 | Sundara et al. |
| 2015/0355049 A1 | 12/2015 | Ait Abdelmalek et al. |
| 2016/0001462 A1 | 1/2016 | Forgeron et al. |
| 2016/0046532 A1 | 2/2016 | Juilland et al. |
| 2016/0107939 A1 | 4/2016 | Monkman et al. |
| 2016/0185662 A9 | 6/2016 | Niven et al. |
| 2016/0272542 A1 | 9/2016 | Monkman et al. |
| 2016/0280598 A1 | 9/2016 | Wang et al. |
| 2016/0280610 A1 | 9/2016 | Forgeron et al. |
| 2016/0340253 A1 | 11/2016 | Forgeron et al. |
| 2016/0355441 A1 | 12/2016 | Tregger et al. |
| 2016/0355442 A1 | 12/2016 | Niven et al. |
| 2017/0015598 A1 | 1/2017 | Monkman et al. |
| 2017/0028586 A1 | 2/2017 | Jordan et al. |
| 2017/0036372 A1 | 2/2017 | Sandberg et al. |
| 2017/0043499 A1 | 2/2017 | Forgeron et al. |
| 2017/0158549 A1 | 6/2017 | Yamada et al. |
| 2017/0158569 A1 | 6/2017 | Lee et al. |
| 2017/0165870 A1 | 6/2017 | Niven et al. |
| 2017/0217047 A1 | 8/2017 | Leon et al. |
| 2017/0252714 A1 | 9/2017 | Bennett et al. |
| 2017/0283293 A1 | 10/2017 | Shin et al. |
| 2018/0022654 A1 | 1/2018 | Forgeron et al. |
| 2018/0029934 A1 | 2/2018 | Monkman et al. |
| 2018/0118622 A1 | 5/2018 | Monkman et al. |
| 2018/0252444 A1 | 9/2018 | Nelson et al. |
| 2018/0258000 A1 | 9/2018 | Lee et al. |
| 2019/0077045 A1 | 3/2019 | Monkman et al. |
| 2019/0168416 A1 | 6/2019 | Monkman et al. |
| 2020/0124054 A1 | 4/2020 | Nagase et al. |
| 2020/0165170 A1 | 5/2020 | Niven et al. |
| 2020/0223760 A1 | 7/2020 | Monkman et al. |
| 2020/0282595 A1 | 9/2020 | Monkman et al. |
| 2022/0001578 A1 | 1/2022 | Forgeron et al. |
| 2022/0013196 A1 | 1/2022 | Monkman et al. |
| 2022/0065527 A1 | 3/2022 | Forgeron et al. |
| 2022/0194852 A1 | 6/2022 | Thomas et al. |
| 2023/0406768 A1 | 12/2023 | Einarsdottir et al. |
| 2024/0116813 A1 | 4/2024 | Monkman et al. |
| 2024/0124366 A1 | 4/2024 | Forgeron et al. |
| 2024/0360035 A1 | 10/2024 | Thomas et al. |
| 2024/0425412 A1 | 12/2024 | Forgeron et al. |

(56) References Cited

U.S. PATENT DOCUMENTS

| | | | |
|---|---|---|---|
| 2025/0114973 A1 | 4/2025 | Monkman et al. | |
| 2025/0187229 A1 | 6/2025 | Monkman et al. | |
| 2025/0191701 A1 | 6/2025 | Monkman et al. | |

FOREIGN PATENT DOCUMENTS

| | | |
|---|---|---|
| AU | 504446 B2 | 10/1979 |
| AU | 2017249444 A1 | 11/2018 |
| CA | 970935 A1 | 7/1975 |
| CA | 1045073 A | 12/1978 |
| CA | 1072440 A | 2/1980 |
| CA | 1185078 A1 | 4/1985 |
| CA | 2027216 A1 | 4/1991 |
| CA | 2343021 A1 | 3/2000 |
| CA | 2362631 A1 | 8/2000 |
| CA | 2598583 A1 | 9/2006 |
| CA | 2646462 A1 | 9/2007 |
| CA | 2630226 A1 | 10/2008 |
| CA | 2659447 A1 | 12/2008 |
| CA | 2703343 A1 | 4/2009 |
| CA | 2705857 A1 | 5/2009 |
| CA | 2670049 A1 | 11/2009 |
| CA | 2668249 A1 | 12/2009 |
| CA | 2778508 A1 | 6/2011 |
| CA | 2785143 A1 | 7/2011 |
| CA | 2501329 C | 6/2012 |
| CA | 2829320 A1 | 9/2012 |
| CA | 2837832 A1 | 12/2012 |
| CA | 2943791 A1 | 10/2015 |
| CA | 3019860 A1 | 10/2017 |
| CA | 3068082 A1 | 12/2018 |
| CL | 1785744 | 12/2019 |
| CN | 2055815 U | 4/1990 |
| CN | 1114007 A | 12/1995 |
| CN | 1267632 A | 9/2000 |
| CN | 2445047 Y | 8/2001 |
| CN | 1357506 A | 7/2002 |
| CN | 2575406 Y | 9/2003 |
| CN | 2700294 Y | 5/2005 |
| CN | 2702958 Y | 6/2005 |
| CN | 2748574 Y | 12/2005 |
| CN | 1735468 A | 2/2006 |
| CN | 1916332 A | 2/2007 |
| CN | 2893360 Y | 4/2007 |
| CN | 2913278 Y | 6/2007 |
| CN | 200961340 Y | 10/2007 |
| CN | 101099596 A | 1/2008 |
| CN | 101319512 A | 12/2008 |
| CN | 101538813 A | 9/2009 |
| CN | 101551001 A | 10/2009 |
| CN | 201325866 Y | 10/2009 |
| CN | 101844826 A | 9/2010 |
| CN | 203357623 U | 12/2013 |
| CN | 105102370 A | 11/2015 |
| CN | 104045251 B | 6/2016 |
| CN | 105174766 B | 5/2017 |
| CN | 107814530 A | 3/2018 |
| CN | 107935507 A | 4/2018 |
| CN | 106746828 B | 5/2019 |
| CN | 110590260 A | 12/2019 |
| DE | 1817001 | 11/1970 |
| DE | 3139107 A1 | 4/1983 |
| DE | 19506411 A1 | 8/1996 |
| DE | 20305552 U1 | 10/2003 |
| EP | 0047675 A1 | 3/1982 |
| EP | 0218189 A2 | 4/1987 |
| EP | 0151164 B1 | 5/1988 |
| EP | 0218189 A3 | 5/1988 |
| EP | 0629597 A1 | 12/1994 |
| EP | 0639650 A1 | 2/1995 |
| EP | 0573524 B1 | 5/1996 |
| EP | 0701503 B1 | 8/2000 |
| EP | 1429096 A2 | 6/2004 |
| EP | 1785245 A1 | 5/2007 |
| EP | 2012149 A1 | 1/2009 |
| EP | 2012150 A1 | 1/2009 |
| EP | 2039589 A1 | 3/2009 |
| EP | 2040135 A2 | 3/2009 |
| EP | 2042326 A2 | 4/2009 |
| EP | 2043169 A2 | 4/2009 |
| EP | 2048525 A1 | 4/2009 |
| EP | 2096498 A1 | 9/2009 |
| EP | 2098362 A1 | 9/2009 |
| EP | 2116841 A1 | 11/2009 |
| EP | 2123700 A1 | 11/2009 |
| EP | 2123942 B1 | 4/2011 |
| EP | 2123465 B1 | 7/2011 |
| EP | 2042317 B1 | 8/2011 |
| EP | 2162639 B1 | 9/2011 |
| EP | 2162640 B1 | 9/2011 |
| EP | 2042535 B1 | 10/2011 |
| EP | 2042324 B1 | 6/2012 |
| EP | 2039393 B1 | 8/2012 |
| EP | 2511003 A1 | 10/2012 |
| EP | 1749629 B1 | 5/2013 |
| EP | 2123441 B1 | 7/2013 |
| EP | 2107000 B1 | 9/2013 |
| EP | 2031010 B1 | 4/2014 |
| EP | 2123808 B1 | 5/2014 |
| EP | 2036952 B1 | 4/2016 |
| EP | 3013544 A1 | 5/2016 |
| EP | 2387551 B1 | 7/2016 |
| EP | 1985754 B1 | 8/2016 |
| EP | 3081842 A1 | 10/2016 |
| EP | 3129126 A1 | 2/2017 |
| EP | 3442761 A1 | 2/2019 |
| EP | 3642170 A4 | 3/2021 |
| EP | 3744700 B1 | 7/2022 |
| ES | 2140302 A1 | 2/2000 |
| FR | 1259819 A | 4/1961 |
| FR | 2121975 A5 | 8/1972 |
| FR | 2281815 A1 | 3/1976 |
| FR | 2503135 A1 | 10/1982 |
| FR | 2513932 A1 | 4/1983 |
| FR | 2735804 A1 | 12/1996 |
| FR | 2805532 A1 | 8/2001 |
| FR | 2969997 B1 | 3/2015 |
| GB | 217791 A | 6/1924 |
| GB | 574724 A | 1/1946 |
| GB | 644615 A | 10/1950 |
| GB | 851222 A | 10/1960 |
| GB | 1167927 A | 10/1969 |
| GB | 1199069 A | 7/1970 |
| GB | 1337014 A | 11/1973 |
| GB | 1460284 A | 12/1976 |
| GB | 1549633 A | 8/1979 |
| GB | 2106886 A | 4/1983 |
| GB | 2192392 A | 1/1988 |
| GB | 2246523 A | 2/1992 |
| GB | 2300631 A | 11/1996 |
| GB | 2302090 A | 1/1997 |
| GB | 2392502 A | 3/2004 |
| GB | 2467005 A | 7/2010 |
| IN | 201817042016 | 4/2017 |
| IN | 201917054847 | 12/2019 |
| JP | S53142542 U | 12/1978 |
| JP | S56115423 A | 9/1981 |
| JP | S5850197 A | 3/1983 |
| JP | S60187354 A | 9/1985 |
| JP | S6150654 A | 3/1986 |
| JP | S62122710 A | 6/1987 |
| JP | S6426403 A | 1/1989 |
| JP | H0218368 A | 1/1990 |
| JP | H0254504 U | 4/1990 |
| JP | H05116135 A | 5/1993 |
| JP | H05117012 A | 5/1993 |
| JP | 5238791 | 9/1993 |
| JP | H0624329 A | 2/1994 |
| JP | H06144944 A | 5/1994 |
| JP | H06263562 A | 9/1994 |
| JP | H0748186 A | 2/1995 |
| JP | H07275899 A | 10/1995 |
| JP | H0835281 A | 2/1996 |
| JP | H0960103 A | 3/1997 |

(56) References Cited

FOREIGN PATENT DOCUMENTS

| | | |
|---|---|---|
| JP | H09124099 A | 5/1997 |
| JP | H10194798 A | 7/1998 |
| JP | 1999324324 A | 11/1999 |
| JP | H11303398 A | 11/1999 |
| JP | H11324324 A | 11/1999 |
| JP | 2000203964 A | 7/2000 |
| JP | 2000247711 A | 9/2000 |
| JP | 2000281467 A | 10/2000 |
| JP | 2001026418 A | 1/2001 |
| JP | 2001170659 A | 6/2001 |
| JP | 2002012480 A | 1/2002 |
| JP | 2002127122 A | 5/2002 |
| JP | 3311436 B2 | 8/2002 |
| JP | 2003206122 A | 7/2003 |
| JP | 2003326232 A | 11/2003 |
| JP | 2005023692 A | 1/2005 |
| JP | 2005273720 A | 10/2005 |
| JP | 2007326881 A | 12/2007 |
| JP | 2008096409 A | 4/2008 |
| JP | 3147769 U | 1/2009 |
| JP | 2009115209 A | 5/2009 |
| JP | 2009136770 A | 6/2009 |
| JP | 4313352 B2 | 8/2009 |
| JP | 2010125386 A | 6/2010 |
| JP | 2010227741 A | 10/2010 |
| JP | 2011073891 A | 4/2011 |
| JP | 2014213479 A | 11/2014 |
| JP | 2017070891 A | 4/2017 |
| JP | 2017074552 A | 4/2017 |
| JP | 2020524103 A | 8/2020 |
| KR | 20020006222 A | 1/2002 |
| KR | 20020042569 A | 6/2002 |
| KR | 20020090354 A | 12/2002 |
| KR | 20030004243 A | 1/2003 |
| KR | 20060010678 A | 2/2006 |
| KR | 20060064557 A | 6/2006 |
| KR | 100766364 B1 | 10/2007 |
| KR | 100950009 B1 | 3/2010 |
| KR | 20110048266 A | 5/2011 |
| MX | 2018012464 A | 8/2019 |
| MX | 2019015651 A | 12/2019 |
| NZ | 183790 A | 9/1980 |
| RU | 2168412 C2 | 6/2001 |
| RU | 2212125 C2 | 9/2003 |
| RU | 2351469 C2 | 4/2009 |
| SE | 8002613 L | 3/1982 |
| SE | 451067 B | 8/1987 |
| SG | 11201810010 P | 12/2018 |
| SG | 11201912759 R | 1/2020 |
| SU | 1031728 A2 | 7/1983 |
| TW | I257330 B | 7/2006 |
| WO | WO-7900473 A1 | 7/1979 |
| WO | WO-8500587 A1 | 2/1985 |
| WO | WO-9105644 A1 | 5/1991 |
| WO | WO-9215753 A1 | 9/1992 |
| WO | WO-9319347 A1 | 9/1993 |
| WO | WO-9427797 A1 | 12/1994 |
| WO | WO-2001064348 A1 | 9/2001 |
| WO | WO-0190020 A2 | 11/2001 |
| WO | WO-2004033793 A2 | 4/2004 |
| WO | WO-2004074733 A1 | 9/2004 |
| WO | WO-2005025768 A1 | 3/2005 |
| WO | WO-2006040503 A1 | 4/2006 |
| WO | WO-2006100550 A1 | 9/2006 |
| WO | WO-2006100693 A1 | 9/2006 |
| WO | 2008057275 A2 | 5/2008 |
| WO | WO-2008149389 A1 | 12/2008 |
| WO | WO-2008149390 A1 | 12/2008 |
| WO | WO-2009078430 A1 | 6/2009 |
| WO | 2009089906 A1 | 7/2009 |
| WO | WO-2009132692 A1 | 11/2009 |
| WO | 2010048457 A1 | 4/2010 |
| WO | WO-2010074811 A1 | 7/2010 |
| WO | 2010110563 A2 | 9/2010 |
| WO | 2012081486 A1 | 6/2012 |
| WO | WO-2012079173 A1 | 6/2012 |
| WO | WO-2013011092 A1 | 1/2013 |
| WO | WO-2014021884 A1 | 2/2014 |
| WO | WO-2014026794 A1 | 2/2014 |
| WO | WO-2014063242 A1 | 5/2014 |
| WO | 2014121198 A1 | 8/2014 |
| WO | 2014154741 A1 | 10/2014 |
| WO | 2014205577 A1 | 12/2014 |
| WO | WO-2015123769 A1 | 8/2015 |
| WO | WO-2015/154174 | 10/2015 |
| WO | WO-2015154162 A1 | 10/2015 |
| WO | WO-2016041054 A1 | 3/2016 |
| WO | 2016082030 A1 | 6/2016 |
| WO | WO-2016082030 | 6/2016 |
| WO | WO-2017000075 A1 | 1/2017 |
| WO | WO-2017041176 | 3/2017 |
| WO | 2017177324 A1 | 10/2017 |
| WO | 2017209025 A1 | 12/2017 |
| WO | WO-2018232507 A1 | 12/2018 |
| WO | 2019068178 A1 | 4/2019 |
| WO | 2020124054 A1 | 6/2020 |
| WO | 2020239683 A1 | 12/2020 |
| WO | 2021028581 A1 | 2/2021 |
| WO | 2021250640 A1 | 12/2021 |
| WO | 2024030519 A2 | 2/2024 |

OTHER PUBLICATIONS

Singapore, Written Opinion for Application No. 11221062015, dated Oct. 18, 2022, 8 pages.
Summons to Attend Oral Proceedings for EP 15777459.7 mailed Aug. 27, 2021, 7 pages.
Zhan et al. "Carbonation Treatment of Recycled Concrete Aggregate: Effect on Transport Properties and Steel Corrosion of Recycled Aggregate Concrete," Cement and Concrete Composites, 104, pp. 1-8 (Apr. 7, 2019).
ASTM International, "Standard Test Method for Slump of Hydraulic-Cement Concrete," Designation: C143/C143M-15a, Revised 5.1.1., Dec. 15, 2015, 4 pages.
Canadian Intellectual Property Office, Canadian Office Action for Application No. 2,943,791 dated Apr. 22, 2021, 3 pages.
Canadian Intellectual Property Office, Canadian Office Action for Application No. 2,943,791 dated May 27, 2022, 3 pages.
Canadian Intellectual Property Office, Canadian Office Action for Application No. 2,943,791 dated Nov. 25, 2021, 4 pages.
Canadian Intellectual Property Office, Canadian Office Action for Application No. 2,945,060, dated Jan. 20, 2022, 4 pages.
Canadian Intellectual Property Office, Canadian Office Action for Application No. 2,979,471 dated Jul. 10, 2020, 3 pages.
Canadian Intellectual Property Office, Canadian Office Action for Application No. 3,120,472 dated Apr. 22, 2022, 3 pages.
Canadian Intellectual Property Office, Canadian Office Action for Application No. 3,120,472 dated Oct. 12, 2022, 4 pages.
Canadian Patent Office, Examination Search Report for CA 2,968,246, dated Aug. 18, 2022, 3 pages.
Chile Patent Office, First Office Action and Translation for Application No. 3376-2020, dated Nov. 18, 2021, 34 Pages.
Chile Patent Office, First Office Action for Application No. 3804-2019, dated Mar. 30, 2021, 24 Pages.
Chile Patent Office, Second Examination Report with English Transmittal for Application No. 3376-2020, dated May 16, 2022, 21 Pages.
Chinese International Search Report for Application No. 2019800306982, dated Mar. 25, 2022, 2 pages.
Corrected First Office Action for Chilean Application No. 3804-2019, mailed Aug. 31, 2021, 51 pages.
Deng, H. et al. "Calcium Carbonate Crystallization Controlled by Functional Groups: A Mini-review.," Frontiers of Materials Science 7, pp. 62-68 (2013); https://doi.org/10.1007/s11706-013-0191-y.
European Communication for European Application No. 17781677.4, dated May 9, 2022, 5 pages.
Examination Report and translation for Brazilian Application No. 112017010897-6 dated Nov. 23, 2021; 7 pages.
Examination Report for Australian Application No. 2017249444 mailed Jul. 28, 2021, 6 pages.

(56) References Cited

OTHER PUBLICATIONS

Examination Report for Australian Application No. 2018288555 mailed Feb. 20, 2021, 5 pages.
Examination Report for Australian Application No. 2018288555 mailed Aug. 9, 2021, 5 pages.
Examination Report for Canadian Application No. 2945060 mailed Apr. 19, 2021, 3 pages.
Examination Report for Canadian Application No. 2968246 mailed Oct. 22, 2021, 4 pages.
Examination Report for EP 15777459.7 mailed Apr. 17, 2020, 7 pages.
Examination Report for European Application No. 17781677.4 dated May 9, 2022; 5 pages.
Examination Report for Indian Application No. 201817042016 mailed Mar. 4, 2021, 5 pages.
Examination Report for Indian Application No. 201917054847 mailed Apr. 20, 2021, 7 pages.
Examination Report for Japanese Application No. JP 2019-571536 mailed Aug. 26, 2021, 86 pages.
Examination Report for Singapore Application No. 11201912759R mailed Dec. 18, 2021, 5 pages.
Extended European Search Report dated Aug. 18, 2020, for European patent application No. 19207508.3, 9 pages.
Extended European Search Report dated Oct. 8, 2018, for European patent application No. EP15862209.2, 10 pages.
Extended European Search Report for EP 19894565.1, Date Aug. 3, 2022.
Extended European Search Report for European Application No. 18820477.0 mailed Feb. 5, 2021, 11 pages.
First Written Opinion, issued by the Intellectual Property Office of Singapore, dated Mar. 3, 2020, for Singapore patent application No. 11201810010P, 8 pages.
Ghacham, "Valorization of waste concrete through CO2 mineral carbonation: optimizing parameter and improving reactivity using concrete separation". Journal of Cleaner Production, 2019, vol. 166, pp. 1-10.
Ho et al., "CO2 Utilization via Direct Aqueous Carbonation of Synthesized Concrete Fines under Atmospheric Pressure". ACS Omega, Jun. 22, 2020 (Jun. 22, 2020), vol. 5, pp. 15877-15890.
India, Examination Report for Application No. 202127030664 dated Dec. 15, 2022, 7 pages.
International Search Report and Written Opinion dated Jan. 13, 2021 for PCT Application No. PCT/US20/54625, 6 pages.
International Search Report and Written Opinion dated Oct. 19, 2021 for PCT Application No. PCT/US21/40764, 11 pages.
International Search Report and Written Opinion dated May 14, 2020 for PCT application No. PCT/US2019/066407, 11 pages.
International Search Report and Written Opinion dated Jul. 22, 2020 for PCT/IB2020/053953, 12 pages.
International Search Report and Written Opinion dated Mar. 29, 2022 for PCT Application No. PCT/IB2021/000718.
International Search Report and Written Opinion dated Aug. 25, 2021 for PCT Application No. PCT/IB2021/055223.
International Search Report and Written Opinion dated Sep. 6, 2018 for PCT/CA2018/050750, 13 pages.
Japanese Patent Application No. 2019-571536, Notice of Reasons for Rejection, (Translation) dated Jun. 8, 2022, 5 pages.
Liang et al., "Utilization of CO2 curing to enhance the properties of recycled aggregate and prepared concrete: A review". Cement and Concrete Composites, Nov. 1, 2019 (Nov. 1, 2019), vol. 105, pp. 1-14 * Abstract;* Section 1.0; * Section 2.2.4; * Fig. 4(d).
Liu, J. et al., "Development of a Co2 solidification method for recycling autoclaved lightweight concrete waste", Journal of Materials Science Letters 20, 2001, pp. 1791-1794.
Lu et al., "Carbon Dioxide Sequestration on Recycled Aggregates," Carbon Dioxide Sequestration in Cementitious Construction Materials, Woodhead Publishing Series in Civil and Structural Engineering, 2018, pp. 247-277.
Lu et al., "Effects of Carbonated Hardened Cement Paste Powder on Hydration and Microstructure of Portland Cement," Construction and Building Materials, 186, pp. 699-708 (2018).
Mexican Office Action for Application No. MX/a/2017/006746 dated Dec. 1, 2022, 5 pages.
Morocco Patent Application No. 53762 Search Report with Opinion on Patentability, dated Jul. 1, 2022, 4 pages.
EP17781677.4 Extended European Search Report dated Nov. 12, 2019.
U.S. Appl. No. 15/304,208 Office Action dated Oct. 25, 2019.
U.S. Appl. No. 15/650,524 Office Action dated Sep. 17, 2019.
Cheung et al. Impact of admixtures on the hydration kinetics of Portland cement. Cement and Concrete Research 41:1289-1309 (2011).
Co-pending U.S. Appl. No. 16/249,012, filed Jan. 16, 2019.
Cornerstone Custom Concrete, LLC. "How Much Does Concrete Weigh?" Retrieved Jul. 15, 2019. <web.archive.org/web/20130124160823/http://www.minneapolis-concrete.com/how-much-does-concrete-weigh.html>. One page. (Year: 2013).
Lobo et al. Recycled Water in Ready Mixed Concrete Operations. Concrete in Focus, Spring 2003 (2003). 10 pages.
"MB-AETM 90: Air-Entraining Admixture" BASF, Product Data (Apr. 2011), 2 pages, found at http://www.basf-admixtures.com/en/products/airentraining/mbae_90/Pages/default.aspx.
EP14746909.2 Summons to Attend Oral Proceedings dated Jun. 19, 2019.
U.S. Appl. No. 15/304,208 Office Action dated Jan. 24, 2019.
U.S. Appl. No. 15/170,018 Notice of Allowance dated Dec. 19, 2018.
U.S. Appl. No. 15/240,954 Ex Parte Quayle Office action dated Feb. 5, 2019.
U.S. Appl. No. 15/240,954 Notice of Allowance dated Mar. 5, 2019.
U.S. Appl. No. 15/284,186 Office Action dated Jun. 14, 2019.
U.S. Appl. No. 15/828,240 Office Action dated Jul. 22, 2019.
Google Patents Translation of EP1785245. pp. 1-2. Retrieved Jul. 17, 2019. (Year: 2007).
Tri-Cast literature, Dry cast machine. Besser Company. Sioux, Iowa, USA. (Jun. 2009).
Co-pending U.S. Appl. No. 15/911,573, filed Mar. 5, 2018.
Co-pending U.S. Appl. No. 15/649,339, filed Jul. 13, 2017.
Co-pending U.S. Appl. No. 62/083,784, filed Nov. 24, 2014.
Co-pending U.S. Appl. No. 62/086,024, filed Dec. 1, 2014.
Co-pending U.S. Appl. No. 62/146,103, filed Apr. 10, 2015.
Co-pending U.S. Appl. No. 62/160,350, filed May 12, 2015.
Co-pending U.S. Appl. No. 62/165,670, filed May 22, 2015.
Co-pending U.S. Appl. No. 62/215,481, filed Sep. 8, 2015.
Co-pending U.S. Appl. No. 62/240,843, filed Oct. 13, 2015.
Co-pending U.S. Appl. No. 62/321,013, filed Apr. 11, 2016.
Co-pending U.S. Appl. No. 62/522,510, filed Jun. 20, 2017.
Co-pending U.S. Appl. No. 62/554,830, filed Sep. 6, 2017.
Co-pending U.S. Appl. No. 62/558,173, filed Sep. 13, 2017.
Co-pending U.S. Appl. No. 62/559,771, filed Sep. 18, 2017.
Co-pending U.S. Appl. No. 62/560,311, filed Sep. 19, 2017.
Co-pending U.S. Appl. No. 62/570,452, filed Oct. 10, 2017.
Co-pending U.S. Appl. No. 62/573,109, filed Oct. 16, 2017.
Co-pending U.S. Appl. No. 62/652,385, filed Apr. 4, 2018.
Co-pending U.S. Appl. No. 62/675,615, filed May 23, 2018.
Co-pending U.S. Appl. No. 61/423,354, filed Sep. 15, 2010.
Co-pending U.S. Appl. No. 61/760,319, filed Feb. 4, 2013.
Co-pending U.S. Appl. No. 61/976,360, filed Apr. 7, 2014.
Co-pending U.S. Appl. No. 61/980,505, filed Apr. 16, 2014.
EP15862209.2 Partial Supplementary European Search Report dated Jun. 20, 2018.
European search report dated Nov. 7, 2017 for EP Application No. 15776706.
European search report with written opinion dated Nov. 14, 2017 for EP Application No. 15777459.
European search report with written opinion dated Nov. 29, 2017 for EP15780122.
Le et al. Hardened properties of high-performance printing concrete. Cement and Concrete Research, vol. 42, No. 3, Mar. 31, 2012, pp. 558-566.

(56) References Cited

OTHER PUBLICATIONS

Mass. Premixed Cement Paste. Concrete International 11(11):82-85 (Nov. 1, 1989).
Office action dated Oct. 19, 2017 for U.S. Appl. No. 15/228,964.
PCT Application No. PCT/CA2014/050611 as filed Jun. 25, 2014.
Younsi, et al. Performance-based design and carbonation of concrete with high fly ash content. Cement and Concrete Composites, Elsevier Applied Science, Barking, GB, vol. 33, No. 1, Jul. 14, 2011. pp. 993-1000.
Co-pending U.S. Appl. No. 15/650,524, filed Jul. 14, 2017.
Co-pending U.S. Appl. No. 15/659,334, filed Jul. 25, 2017.
European search report with written opinion dated Feb. 2, 2017 for EP2951122.
European search report with written opinion dated Jan. 20, 17 for EP14818442.
International search report with written opinion dated Jun. 15, 2017 for PCT/CA2017/050445.
International search report with written opinion dated Jul. 3, 2016 for PCT/CA2015/050195.
Notice of allowance dated Apr. 14, 2017 for U.S. Appl. No. 15/157,205.
Notice of allowance dated Apr. 24, 2017 for U.S. Appl. No. 15/161,927.
Notice of allowance dated Jun. 15, 2017 for U.S. Appl. No. 15/157,205.
Notice of allowance dated Jun. 22, 2017 for U.S. Appl. No. 15/161,927.
Notice of allowance dated Jun. 30, 2017 for U.S. Appl. No. 15/434,429.
Notice of allowance dated Jul. 28, 2017 for U.S. Appl. No. 15/434,429.
Notice of allowance dated Aug. 2, 2017 for U.S. Appl. No. 15/161,927.
Office action dated Feb. 27, 2017 for U.S. Appl. No. 14/171,350.
Office action dated Mar. 7, 2017 for U.S. Appl. No. 15/434,429.
Office action dated Mar. 14, 2017 for U.S. Appl. No. 15/228,964.
Office action dated May 10, 2017 for U.S. Appl. No. 13/994,681.
Office action dated Jul. 3, 2017 for U.S. Appl. No. 14/171,350.
Yelton, R. Treating Process Water. The Concrete Producer. pp. 441-443. Jun. 1, 1997.
Co-pending U.S. Appl. No. 15/284,186, filed Oct. 3, 2016.
International Search Report and Written Opinion dated Aug. 30, 2016 for International application No. PCT/CA2016/050773.
International Search Report and Written Opinion dated Oct. 19, 2016 for International Application No. PCT/CA2016/051062.
Kim, et al. Properties of cement-based mortars substituted by carbonated fly ash and carbonated under supercritical conditions. IJAER. 9(24), 25525-25534 (2014).
Notice of Allowance dated Dec. 21, 2016 for U.S. Appl. No. 15/161,927.
Office Action dated Nov. 3, 2016 for U.S. Appl. No. 15/161,927.
Office Action dated Dec. 29, 2016 for U.S. Appl. No. 15/157,205.
Office Action dated Dec. 30, 2016 for U.S. Appl. No. 13/994,681.
Abanades, et al. Conversion limits in the reaction of CO2 with lime. Energy and Fuels. 2003; 17(2):308-315.
Author Unknown, "Splicing Solution," Quarry Management, Oct. 2002, 3 pages.
Bhatia, et al. Effect of the Product Layer on the kinetics of the CO2-lime reaction. AIChE Journal. 1983; 29(1):79-86.
Chang, et al. The experimental investigation of concrete carbonation depth. Cement and Concrete Research. 2006; 36(9):1760-1767.
Chen, et al. On the kinetics of Portland cement hydration in the presence of selected chemical admixtures. Advances in Cement Research. 1993; 5(17):9-13.
"Clear Edge Filtration—Screen and Filter, Process Belts, and Screen Print," Mining-Techology.com, no date, [retrieved on May 25, 2010]. Retrieved from: http/www.mining-technology.com/contractors/filtering/clear-edge/, 2 pages.
Co-pending U.S. Appl. No. 15/170,018, filed Jun. 1, 2016.
Co-pending U.S. Appl. No. 15/184,219, filed Jun. 16, 2016.
Co-pending U.S. Appl. No. 15/228,964, filed Aug. 4, 2016.
Co-pending U.S. Appl. No. 15/240,954, filed Aug. 18, 2016.
Co-pending U.S. Appl. No. 62/096,018, filed Dec. 23, 2014.
Co-pending U.S. Appl. No. 61/839,312, filed Jun. 25, 2013.
Co-pending U.S. Appl. No. 61/847,254, filed Jul. 17, 2013.
Co-pending U.S. Appl. No. 61/879,049, filed Sep. 17, 2013.
Co-pending U.S. Appl. No. 61/925,100, filed Jan. 8, 2014.
Co-pending U.S. Appl. No. 61/938,063, filed Feb. 10, 2014.
Co-pending U.S. Appl. No. 61/941,222, filed Feb. 18, 2014.
Co-pending U.S. Appl. No. 61/992,089, filed May 12, 2014.
Dewaele, et al. Permeability and porosity changes associated with cement grout carbonation. Cement and Concrete Research. 1991; 21(4):441-454.
Dorbian "Nova Scotia-based CArbonCure garners $3.5 min in Series B funds," Reuters PE Hub, Dec. 11, 2013, 6 pages, found at http://www.pehub.com/2013/12/nova-scotia-based-carboncure-garners-3-5-mln-in-series-b-funds/.
Estes-Haselbach. The greenest concrete mixer—carbon sequestration in freshly mixed concrete. Sep. 25, 2012.
Eurpoean search report and search opinion dated Jan. 14, 2015 for EP 11849437.6.
Fernandez-Bertos, et al. A review of accelerated carbonation technology in the treatment of cement-based materials and sequestration of CO2. Journal of Hazardous Materials B112. 2004; 193-205.
Fluid Hole and Size. Newton: Ask a Scientist. Jan. 24, 2005. Retrieved from http://www.newton.dep.anl.gov/askasci/eng99/eng99365.htm on Jul. 13, 2013.
Freedman, S. Carbonation Treatment of Concrete Masonry Units. Modern Concrete. 1969; 33(5):33-6.
Gager, "Trumbull Corp.: Charleroi Lock & Dam," Construction Today, 2010, [retrieved on May 25, 2010]. Retrieved from http://www.construction-today.com/cms1/content/view/1909/104/, 2 pages.
"Glenium® 3400 NV: High-Range Water-Reducing Admixture," BASF, Product Data, Jun. 2010, 2 pages.
Goodbrake, et al. Reaction of Hydraulic Calcium Silicates with Carbon Dioxide and Water. Journal of the American Ceramic Society. 1979; 62(9-10):488-491.
Goto, et al. Calcium Silicate Carbonation Products. Journal of the American Ceramic Society. 1995; 78(11):2867-2872.
Goto. Some mineralo-chemical problems concerning calcite and aragonite, with special reference to the genesis of aragonite. Contribution from the department of geology and mineralogy. Faculty of Science. Hokkaido University. 1961. http://eprints.lib.hokudai.ac.jp/dspace/bitstream/2115/35923/1/10(4)_571-640.pdf.
Hesson, et al. Flow of two-phase carbon dioxide through orifices. AIChE Journal 4.2 (1958): 207-210.
Huijgen, et al. Mineral CO2 sequestration by steel slag carbonation. Environmental Science and Technology. 2005; 39(24):9676-9682.
Huntzinger, et al. Carbon dioxide sequestration in cement kiln dust through mineral carbonation. Environ Sci Technol. Mar. 15, 2009;43(6):1986-92.
Hurst. Canadian cement plant becomes first to capture CO2 in algae. Earth and Industry. Pond Biofuels press release. Mar. 19, 2010.
Iizuka, et al. Development of a new CO2 sequestration process utilizing the carbonation of waste cement. Industrial & Engineering Chemistry Research. 2004; (43)24:7880-7887.
International search report and written opinion dated Jan. 25, 2016 for PCT Application No. PCTCA2015/051220.
International search report and written opinion dated Mar. 6, 2012 for PCT Application No. CA2011/050774.
International search report and written opinion dated May 4, 2015 for PCT/CA2015/050118.
International search report and written opinion dated Jul. 16, 2015 for PCT Application No. PCT/CA2015/000158.
International search report and written opinion dated Jul. 16, 2015 for PCT Application No. PCT/CA2015/050318.
International search report and written opinion dated Jul. 18, 2013 for PCT Application No. CA2013/050190.
International search report and written opinion dated Sep. 18, 2014 for PCT/CA2014/050611.
International search report dated May 16, 2014 for PCT Application No. PCT/US14/14447.

(56) References Cited

OTHER PUBLICATIONS

Kashef-Haghighi, et al. Accelerated Concrete Carbonation, a CO2 Sequestration Technology. 8th World Congress of Chemical Engineering WCCE8. Aug. 24, 2009.
Kashef-Haghighi, et al. CO2 sequestration in concrete through accelerated carbonation curing in a flow-through reactor. Ind. Eng. Chem. Res. 2010; 49:1143-1149.
Kawashima, et al. Dispersion of CaCO3 Nanoparticles by Sonication and Surfactant Treatment for Application in Fly Ash-Cement Systems. Materials and Structures. May 28, 2013. DOI 10.1617/S11527-013-0110-9.
Lange, et al. Preliminary investigation into the effects of carbonation on cement-solidified hazardous wastes. Environmental Science and Technology. 1996; 30(1):25-30.
Logan, C. Carbon dioxide absorption and durability of carbonation cured cement and concrete compacts. Thesis. Department of Civil Engineering, McGill University. Montreal, QC, Canada. 2006.
Lomboy, et al. Atom Probe Tomography for Nanomodified Portland Cement. Nanotechnology in Construction. Springer International Publishing, 2015. 79-86.
"MB-AETM 90: Air-Entraining Admixture" BASF, Product Data, Apr. 11, 2 pages, found at http://www.basf-admixtures.com/en/products/airentraining/mbae_90/Pages/default.aspx.
Mehta. "Concrete Carbonation". Materials World Magazine. Oct. 1, 2008 [Retrieved on Jul. 13, 2013] Retrieved from http://www.iom3.org/news/concrete-carbonation.
Monkman, et al. Assessing the Carbonation Behavior of Cementitious Materials. J. Mater. Civ. Eng. 2006; 18(6), 768-776.
Monkman, et al. Carbonated Ladle Slag Fines for Carbon Uptake and Sand Substitute. Journal of Materials in Civil Engineering. Nov. 2009;657-665.
Monkman, et al. Carbonation Curing of Slag-Cement Concrete for Binding CO2 and Improving Performance. Journal of Materials in Civil Engineering. Apr. 2010; 296-304.
Monkman, et al. Integration of carbon sequestration into curing process of precast concrete. Can. J. Civ. Eng. 2010; 37:302-310.
Monkman, G. S. Investigating Carbon Dioxide Sequestration in Fresh Ready Mixed Concrete. International Symposium on Environmentally Friendly Concrete—ECO-Crete 13,—Aug. 15, 2014, Reykjavik, Iceland.
Monkman, S. Maximizing carbon uptake and performance gain in slag-containing concretes through early carbonation. Thesis. Department of Civil Engineering and Applied Mechanics, McGill University. Montreal, QC, Canada. 2008.
Niven, et al. Carbon Dioxide Uptake Rate and Extent during Accelerated Curing of Concrete. International Congress on the Chemistry of Cement 2007. ICCC 2007.
Niven. Industrial pilot study examining the application of precast concrete carbonation curing. Cardon Sense Solutions Inc. Halifax, Canada. ACEME 2008.
Niven. Physiochemical investigation of CO2 accelerated concrete curing as a greenhosue gas mitigation technology. These from the Department of Civil Engineering and Applied Mechanics. McGill University, Montreal, Canada. Oct. 2006.
Notice of allowance dated Feb. 26, 2016 for U.S. Appl. No. 14/642,536.
Notice of allowance dated Mar. 29, 2016 for U.S. Appl. No. 14/701,456.
Notice of allowance dated Apr. 22, 2014 for U.S. Appl. No. 13/660,447.
Notice of allowance dated Apr. 24, 2015 for U.S. Appl. No. 14/249,308.
Notice of allowance dated Apr. 25, 2016 for U.S. Appl. No. 14/642,536.
Notice of allowance dated May 6, 2016 for U.S. Appl. No. 14/796,751.
Notice of allowance dated May 11, 2016 for U.S. Appl. No. 14/701,456.
Notice of allowance dated Jun. 24, 2015 for U.S. Appl. No. 14/249,308.
Notice of allowance dated Jul. 5, 2016 for U.S. Appl. No. 14/282,965.
Notice of allowance dated Aug. 5, 2016 for U.S. Appl. No. 14/796,751.
Notice of allowance dated Aug. 16, 2016 for U.S. Appl. No. 14/796,751.
Notice of allowance dated Sep. 14, 2016 for U.S. Appl. No. 14/796,751.
Notices of allowance dated Mar. 3, 2016 and Mar. 17, 2016 for U.S. Appl. No. 14/701,456.
Office action dated Jan. 25, 2016 for U.S. Appl. No. 14/701,456.
Office action dated Mar. 7, 2016 for U.S. Appl. No. 14/796,751.
Office action dated Mar. 10, 2015 for U.S. Appl. No. 14/249,308.
Office action dated Mar. 28, 2013 for U.S. Appl. No. 13/660,447.
Office action dated Apr. 26, 2016 for U.S. Appl. No. 14/950,288.
Office Action dated Jun. 16, 2016 for U.S. Appl. No. 13/994,681.
Office action dated Jul. 15, 2013 for U.S. Appl. No. 13/660,447.
Office action dated Jul. 30, 2015 for U.S. Appl. No. 14/282,965.
Office action dated Aug. 12, 2016 for U.S. Appl. No. 14/950,288.
Office action dated Aug. 14, 2015 for U.S. Appl. No. 14/701,456.
Office action dated Aug. 18, 2015 for U.S. Appl. No. 14/642,536.
Office action dated Aug. 22, 2016 for U.S. Appl. No. 15/161,927.
Office action dated Sep. 2, 2016 for U.S. Appl. No. 15/228,964.
Office action dated Sep. 28, 2016 for U.S. Appl. No. 15/157,205.
Office action dated Oct. 5, 2015 for U.S. Appl. No. 14/701,456.
Office action dated Dec. 2, 2015 for U.S. Appl. No. 14/282,965.
Office action dated Dec. 7, 2015 for U.S. Appl. No. 14/796,751.
Papadakis, et al. A reaction engineering approach to the problem of concrete carbonation. AIChE Journal. 1989; 35(10):1639-1650.
Papadakis, et al. Fundamental Modeling and Experimental Investigation of Concrete Carbonation. ACI Materials Journal. 1991; 88(4):363-373.
Phipps and MacDonald. Sustainability Leads to Durability in the New I-35W Bridge. Concrete International. Feb. 2009; vol. 31 Issue 2, p. 27-32.
"Pozzolith® 200N: Water-Reducing Admixture," BASF, Product Data, Sep. 2010, 2 pages, found at http://www.basf-admixtures.com/en/products/waterreducingretarding/pozzolith200n/Pages/default.aspx.
"Pozzolith® 322 N: Water-Reducing Admixture," BASF, Product Data, Mar. 2007, 2 pages.
Preliminary Amendment dated Nov. 1, 2013 for U.S. Appl. No. 13/994,681.
Reardon, et al. High pressure carbonation of cementitious grout. Cement and Concrete Research. 1989; 19(3):385-399.
Sato, et al. Effect of Nano-CaCO3 on Hydration of Cement Containing Supplementary Cementitious Materials. Institute for Research in Construction, National Research Council Canada. Oct. 2010.
Sato, et al. Seeding effect of nano-CaCO3 on the hidration of tricalcium silicate, Transportation Research Record. 2010; 2141:61-67.
Shao, et al. A new CO2 sequestration process via concrete products production. Department of civil engineering. McGill University, Montreal, Canada. 2007.
Shao, et al. CO2 sequestration using calcium-silicate concrete. Canadian Journal of Civil Engineering. 2006;(33)6:776-784.
Shao, et al. Market analysis of CO2 sequestration in concrete building products. Second International Conference on Sustainable Construction Materials and Technologies. Jun. 28-30, 2010.
Shao, et al. Recycling carbon dioxide into concrete: a feasibility study. Concrete Sustainability Conference. 2010.
Shi, et al. Studies on some factors affecting CO2 curing of lightweight concrete products. Resources, Conservation and Recycling. 2008; (52)8-9:1087-1092.
Shideler, J. Investigation of the moisture-volume stability of concrete masonry units. Portland Cement Association. 1955. (D3).
Shih, et al. Kinetics of the reaction of Ca(OH)2 with CO2 at low temperature. Industrial and Engineering Chemistry Research. 1999; 38(4):1316-1322.
Sorochkin, et al. Study of the possibility of using carbon dioxide for accelerating the hardening of products made from Portland Cement. J. Appl. Chem. USSR. 1975; 48:1271-1274.
Steinour, H. Some effects of carbon dioxide on mortars and concrete-discussion. Journal of the American Concrete Institute. 1959; 30:905-907.

(56) References Cited

OTHER PUBLICATIONS

Technology Roadmap: Cement. International Energy Agency. Dec. 2009 [Retrieved on Jul. 13, 2013]. Retrieved from http://www.iea.org/publications/freepublications/publication/name,3861,en.html.
Teir, et al. Carbonation of Finnish magnesium silicates for CO2 sequestration . Fifth Annual Conference on Carbon Capture and Sequestration. May 8-11, 2006. National Energy Technology Laboratory, Department of Energy, USA.
The Vince Hagan Co., "Stationary, Radial Stacking, and Wet Belt Converyors—Product Brochure," 4 pages.
Toennies, et al. Artificial carbonation of concrete masonry units. American Concrete Institute Journal. 1960; 31(8):737-755.
Tri-Cast literature, Besser Company. Sioux, Iowa, USA.
U.S. Appl. No. 13/660,447, filed Oct. 25, 2012.
U.S. Appl. No. 13/994,681, filed Jun. 14, 2013.
U.S. Appl. No. 14/249,308, filed Apr. 9, 2014.
U.S. Appl. No. 14/282,965, filed May 20, 2014.
U.S. Appl. No. 14/642,536, filed Mar. 9, 2015.
U.S. Appl. No. 14/701,456, filed Apr. 30, 2015.
U.S. Appl. No. 14/796,751, filed Jul. 10, 2015.
U.S. Appl. No. 14/950,288, filed Nov. 24, 2015.
U.S. Appl. No. 61/839,312, filed Jun. 25, 2013.
U.S. Appl. No. 61/847,254, filed Jul. 17, 2013.
U.S. Appl. No. 61/879,049, filed Sep. 17, 2013.
U.S. Appl. No. 61/925,100, filed Jan. 8, 2014.
U.S. Appl. No. 61/938,063, filed Feb. 10, 2014.
U.S. Appl. No. 61/941,222, filed Feb. 18, 2014.
U.S. Appl. No. 61/976,360, filed Apr. 7, 2014.
U.S. Appl. No. 61/980,505, filed Apr. 16, 2014.
Van Balen, K. Carbonation reaction of lime, kinetics at ambient temperature. Cement and Concrete Research. 2005; 35(4):647-657.
Venhuis, et al. Vacuum method for carbonation of cementitious wasteforms. Environ Sci Technol. Oct. 15, 2001;35(20):4120-5.
Weber, et al. Find carbon dioxide gas under pressure an efficient curing agent for cast stone. Concrete. Jul. 1941; 33-34.
Young, et al. Accelerated Curing of Compacted Calcium Silicate Mortars on Exposure to CO2. Journal of the American Ceramic Society.. 1974; 57(9):394-397.
Indonesia Application No. P00202105311 Substantive Examination Results Stage I dated Jan. 11, 2023, 8 pages.
Canadian Office Action for Application No. 3,019,860 dated Mar. 2, 2023, 3 pages.
Zhang et al. "Influence of carbonated recycled concrete aggregate on properties of cement mortar," ScienceDirect Construction and Building Materials 98 (2015) 1-7; http://dx.doi.org/10.1016/j.conbuildmat.2015.08.087.
Zhang et al. "Performance Enhancement of Recycled Concrete Aggregates through Carbonation," ResearchGate Journal of Materials in Civil Engineering • Mar. 2015, 8 pages.
Australian Patent Office; Examination Report for European Application No. 2022201059 dated May 22, 2023; 4 pages.
Canadian Intellectual Property Office Office Action for CA Application No. 3,068,082, dated Sep. 3, 2024, 7 pages.
Columbian Second Office Action for Application No. NC2021/0009084, dated Apr. 8, 2024, 21 pages.
Dorbian "Nova Scotia-based Carbon Cure garners $3.5 min in Series B funds," Reuters PE HUB, Dec. 11, 2013, 6 pages, found at http://www.pehub.com/2013/12/nova-scotia-based-carboncure-garners-3-5-mln-in-series-b-funds/ (Year: 2013), 6 pages.
Estes-Haselbach. The greenest concrete mixer—carbon sequestration in freshly mixed concrete, Sep. 25, 2012 (Year: 2012), 2 pages.
European Patent Office—Extended European Search Report from Application No. 24156817.9 dated Nov. 12, 2024, 10 pages.
European Patent Office Communication pursuant to Rules 70(2) and 70a(2), dated Jun. 27, 2024, 1 page.
European Patent Office Extended European Search Report and Search Opinion, European Application No. 21822959.9, dated Jun. 10, 2024, 8 pages.
European Patent Office Extended European Search Report for EP Application No. 218854.4.7, dated Sep. 20, 2024, 8 pages.
European Patent Office Extended Examination Report for EP 19894565.1, dated Jun. 6, 2024, 9 pages.
European Patent Office Extended European Search Report for Application No. EP 11849437.6, dated Jan. 14, 2015, 5 pages.
European Patent Office Partial Search Report for EP Application No. 24156817.9, dated Aug. 8, 2024, pp. 1-12.
European Patent Office Supplemental European Search Report and Rule 70 for Application No. 20794190.7 dated May 4, 2023, 10 pages.
European Patent Office Supplemental European Search Report and Search Opinion (SESR), for Application No. EP 21838519.3, dated Jun. 10, 2024, 6 pages.
European Patent Office Supplemental European Search Report for EP 20874721.2 dated Nov. 6, 2023, 10 pages.
Fernandez-Bertos, et al. A review of accelerated carbonation technology in the treatment of cement-based materials and sequestration of CO2. Journal of Hazardous Materials B112. 2004; (Year: 2004), 13 pages.
Fluid Hole and Size. Newton: Ask a Scientist. Jan. 24, 2005. Retrieved from http://www.newton.dep.anl.gov/asksci/eng99/eng99365.htm on Jul. 13, 2013 (Year: 2005), 5 pages.
Freedman, S. Carbonation Treatment of Concrete Masonry Units. Modern Concrete. 1969; 33(5):33-6 (Year: 1969).
Gager, "Trumbull Corp.: CHARLEROI Lock & DAM," Construction Today, 2010, [retrieved on May 25, 2010]. Retrieved from http://www.construction-today.com/cms1/content/view/1909/104/, 2 pages. (Year: 2010).
Israeli Patent Office Office Action for Application No. 283905, dated May 28, 2024, 6 pages.
Japanese Patent Office Office Action for Application No. 2020-551893, dated Sep. 26, 2023, [Translation], 30 pages.
Japanese Patent Office, Office Action regarding Patent Application No. 2020-551893, Jun. 25, 2024 (Translation), 15 pages.
Kaliyavaradhan Senthil Kumar et al.: "Valorization of waste powders from cement-concrete life cycle: A pathway to circular future", Journal of Cleaner Production, Elsevier, Amsterdam, NL, vol. 268, May 22, 2020, 25 pages.
Malaysian Patent Office, Substantive Examination and Search Report, Application No. PI2021003227, dated Mar. 13, 2024, 3 pages.
Mexican Patent Office First Office Action for Patent Application No. MX/a/2021/006988, dated Jul. 16, 2024, [Translation], 7 pages.
Mexican Patent Office Office action for Application No. MX/a/2017/006746, dated May 12, 2023, 8 pages.
Mexican Patent Office Office Action for Application No. MX/a/2024/000011, dated Jan. 25, 2024, 24 pages.
Mexican Patent Office, Office Action for Application No. MX/a/2018/012464, dated Jul. 20, 2023, 8 pages.
Monkman et al., The Durability of Concrete Produced Using CO2 as an Admixture, pp. 1-10, date: Aug. 2016, Fourth 1-3 International Conference on Sustainable Construction Materials and Technologies, Las Vegas, USA, Retrieved from the internet: URL:https:1/www.researchgate.net/publication/343117870.
Monkman, Sean G. Investigating carbon dioxide sequestration in fresh ready mixed concrete, Eco-Crete, International Symposium on Sustainability Aug. 13, 2014, 22 pages.
Saudi Authority for Intellectual Property Office, First Examination Report, Application No. 522432205, dated Jul. 25, 2024, 12 pages.
Singapore Patent Office Examination Report for SG11202203433R, dated Jun. 7, 2023, 5 pages.
Singapore Patent Office Search Report for Application No. SG11202203433R, dated May 15, 2023, 2 pages.
Singapore Patent Office Substantive Examination and Written Opinion, Patent Application No. 10202010009X, dated Aug. 22, 2024, 8 pages.
UAE Patent Office—English Translation of First Office Action Summary and Search Report, dated Oct. 4, 2024, 9 pages.
United States International Search Report and Written Opinion for PCT/US23/029354, dated Feb. 1, 2024, 25 pages.
Vietnam Patent Office Substantive Examination for Application No. 1-2021-03941 dated Oct. 18, 2023, 3 pages.
Australia Patent Office Examination Report No. 1 dated Dec. 13, 2024 for Application No. 2019397557, 4 pages.

(56) References Cited

OTHER PUBLICATIONS

Canadian Intellectual Property Office, Canadian Office Action, CA Application No. 3,212,028, dated Jan. 30, 2025, 3 pages.
Mexican Patent Office Second Office Action for MX Application No. MX/a/2021/006988 dated Jan. 29, 2025, 11 pages.
Japanese Patent Office, Reasons for Rejection for Application No. JP 2022521047, dated Nov. 12, 2024, 9 pages.
European Patent Office Extended Search Report for EP Application No. 24212047.5, dated Apr. 23, 2025, 11 pages.
International Searching Authority, International Search Report from PCT Application No. PCT/US25/14881, dated May 23, 2025, 11 pages.
Japanese Patent Office, Reasons for Rejection for JP Application No. 2022-521047, dated Mar. 25, 2025, 9 pages.
Korean Patent Office Office Action for KR Application No. 9-5-2025-026673704, dated Mar. 18, 2025, 22 pages.
Pei, Junjie et al., Use of carbonated Portland cement clinkers as a reactive or non-reactive aggregate for the production of cement mortar, dated 2022, pp. 1-9.
UAE Patent Office, English Translation of Office Action Summary and Search Report from UAE Application No. P6000969/2021, dated Mar. 16, 2025, 8 pages.
Yang et al., Influence of dry ice on the performance of Portland cement and its mechanism, dated Aug. 17, 2018, pp. 1-7, School of Materials Science and Engineering, Henan Polytechnic University, Jiaozuo, Henan 454003, PR China.
Canadian Intellectual Property Office, Examination Report for CA Application No. 3,225,611 dated Feb. 6, 2025, 4 pages.
Saudi Arabia Intellectual Property Office, 2nd Substantive Examination Report for Application No. 522432205, dated Feb. 18, 2025, 14 pages.
US Patent Office Restriction Requirement for U.S. Appl. No. 18/979,708 dated Mar. 6, 2024, 10 pages.
Canadian Patent Office, Canadian Examiner's Report, Canadian Application No. 3,122,573, dated May 26, 2025, 7 pages.
European Patent Office, European Office Action, European Application No. 21822959.9, dated Apr. 25, 2025, 5 pages.

\* cited by examiner

Figure 4: Expansion with Carbonated RJC

Figure 5: Expansion with Li-Treated RJC

CARBONATION OF CONCRETE AGGREGATES

CROSS-REFERENCE

This application claims the benefit of U.S. Provisional Applications Nos. 62/839,303, filed Apr. 26, 2019, and 62/865,898, filed Jun. 24, 2019, both of which applications are incorporated herein by reference.

BACKGROUND OF THE INVENTION

Recycled concrete aggregate (RCA) produced, for example, by crushing concrete from structures affected by alkali-silica reaction (ASR) can induce expansion and damage in new concrete produced using the RCA even when preventive measures are implemented to control ASR. The damage can be prevented by carbonating the RCA prior to its use in new concrete. RCA can have other advantages, as well.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

In one aspect, provided herein are methods.

In certain embodiments, provided herein is method of producing a wet concrete mix comprising combining hydraulic cement, water, and aggregate, wherein a portion of the aggregate is recycled concrete aggregate that has been exposed to carbon dioxide to carbonate the aggregate with the carbon dioxide; and either (i) the water comprises carbonated water; (ii) the concrete mix is exposed to carbon dioxide during mixing; or a combination of (i) and (ii). In certain embodiments, the water comprises carbonated water, such as carbonated water that comprises carbonated wash water. In certain embodiments, the water comprises 1-100% carbonated wash water. In certain embodiments, the concrete mix is exposed to carbon dioxide during mixing at a dose of 0.01-2% by weight cement (bwc). In certain embodiments, the carbon dioxide comprises carbon dioxide derived from flue gas from a power plant or a cement plant. In certain embodiments, the carbon dioxide comprises carbon dioxide derived from flue gas of a cement plant. In certain embodiments, carbon dioxide is delivered as liquid carbon dioxide that is converted to solid and gaseous carbon dioxide.

In certain embodiments, provided herein is a method comprising (i) capturing carbon dioxide at a source of carbon dioxide; (ii) converting the captured carbon dioxide into a form that can be transported if it is not already in such a form; (iii) transporting the carbon dioxide to a facility that comprises recycled concrete aggregates; (iv) exposing the recycled concrete aggregates to the transported carbon dioxide to produce carbonated recycled concrete aggregates. In certain embodiments, at least a portion of the recycled concrete aggregates at the facility are produced from used concrete at the facility. In certain embodiments, the source of carbon dioxide comprises a cement production facility or a power plant. In certain embodiments, the source of carbon dioxide comprises a cement production facility. In certain embodiments, step (ii) comprises converted gaseous carbon dioxide to liquid carbon dioxide. In certain embodiments, the method further comprises transporting the liquid carbon dioxide to the facility comprising recycled concrete aggregates. In certain embodiments, the facility comprising recycled concrete aggregates produces at least a part of the recycled concrete aggregates from used concrete. In certain embodiments, the facility produces coarse aggregates and/or fine aggregates, and the method comprises delivering carbon dioxide to the coarse aggregates and/or the fine aggregates to carbonate the coarse aggregates and/or the fine aggregates. In certain embodiments, the method further comprises mixing the carbonated recycled concrete aggregates with cement and water to produce a wet concrete mix. In certain embodiments, the method further comprises delivering carbon dioxide to the wet concrete mix. In certain embodiments, the concrete mix and the carbonated recycled concrete aggregates are produced at the same facility. In certain embodiments, the carbonated recycled aggregates are produced at a first facility and are transported to a second facility where the wet concrete mix is produced. In certain embodiments, carbon dioxide is delivered to the wet concrete mix as a mixture of gaseous and solid carbon dioxide. In certain embodiments, the water used in the concrete mix comprises carbonated water. In certain embodiments, the method further comprises carbonating water to produce the carbonated mix water. In certain embodiments, carbonating water comprises carbonating wash water produced at the facility and transporting the carbonated wash water to the concrete mix produced at the facility.

In one aspect, provide herein are compositions.

In certain embodiments, provided herein is a wet concrete mix comprising hydraulic cement, water, and aggregate, wherein a portion of the aggregate is carbonated recycled concrete aggregate (RCA), and wherein either the cement or the water, or both, is at least partially carbonated. The portion of aggregate that is carbonated RCA can be, e.g., 0.5% to 90% of the total aggregate. The carbonated RCA can comprise coarse aggregate, fine aggregate, or a combination thereof. In certain embodiments, the composition further comprises carbonated hydraulic cement, wherein the hydraulic cement is carbonated at a level of, e.g., 0.005-5% carbon dioxide (as carbon dioxide by weight cement. In certain embodiments, the water comprises carbonated wash water. In certain embodiments, the water comprises 1-100% carbonated wash water. In certain embodiments, the water comprises carbonated water.

In certain embodiments, provided herein is a system comprising (i) a source of carbon dioxide operably connected to (ii) a facility that comprises recycled concrete aggregates; and (iii) a system for delivering the carbon dioxide to the recycled concrete aggregates to carbonate the recycled concrete aggregates. In certain embodiments, the facility comprising recycled concrete aggregates produces at least a portion of the recycled concrete aggregates from used concrete. In certain embodiments, the source of carbon dioxide comprises a cement production facility or a power plant. In certain embodiments, the source of carbon dioxide comprises a cement production facility. In certain embodiments, the carbon dioxide at the source of carbon dioxide comprises gaseous carbon dioxide, and wherein the system further comprises a component to convert the gaseous carbon dioxide to liquid carbon dioxide. In certain embodiments, the system further comprises a component to transport the liquid carbon dioxide to the facility for processing concrete. In certain embodiments, the component to transport the liquid carbon dioxide to the facility comprises a conduit suited to transport the liquid carbon dioxide. In certain embodiments, the facility comprising recycled concrete aggregates comprises coarse aggregates and fine aggregates, and the system for delivering carbon dioxide delivers carbon dioxide to the coarse aggregates and/or the fine aggregates to carbonate the coarse aggregates and/or the fine aggregates. In certain embodiments, the system further comprises a concrete-producing facility and a component to deliver carbonated recycled concrete aggregates to the concrete-producing facility to be used in concrete mix produced at the facility. In certain embodiments, the concrete-producing facility is configured to deliver carbon dioxide to a wet concrete mix produced at the facility. In certain embodiments, the concrete-producing facility is configured to deliver mix water to a concrete mix wherein the mix water comprises carbonated mix water. In certain embodiments, the carbonated mix water comprises carbonated wash water. In certain embodiments, the concrete-producing facility comprises a component to carbonate wash water produced at the facility and to transport the carbonated wash water to a concrete mix produced at the facility.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
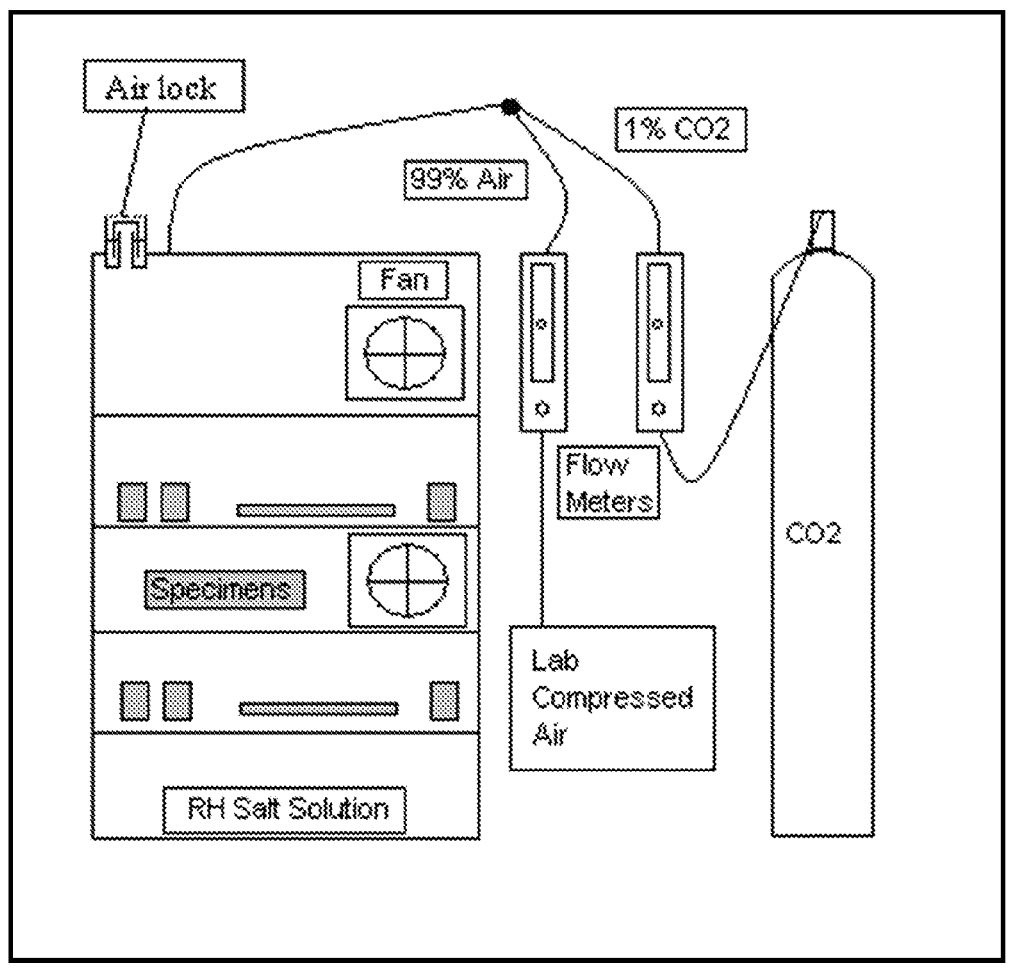
FIG. 1 shows a system to store and carbonate recycled aggregate

Described herein are methods and compositions for carbonating recycled concrete aggregate and using carbonated concrete aggregate. The methods and compositions are generally applicable, and particularly applicable to recycled concrete aggregate from structures affected by alkali-silica reaction Recycled concrete aggregate (RCA) produced by crushing concrete from structures affected by alkali-silica reaction (ASR) can induce expansion and damage in new concrete produced using the RCA even when preventive measures are implemented to control ASR. The damage can be prevented by carbonating the RCA prior to its use in new concrete The consideration of concrete as a sustainable building material is related to its relatively low embodied emissions per unit mass and low operating emissions associated with the use stage of a building in service. The sustainability of concrete is further demonstrated by considering it to be a recyclable construction material; returned or reclaimed concrete can be crushed for use as aggregates in new construction. The practice not only reduces waste disposal but helps to conserve natural resources and can realize economic benefits.

Recycled concrete processing is often aligned with the demolition of a structure at the end of its service life. In many cases, end of service life is associated with a reduced performance particularly with respect to durability. Insofar as adhered paste is a part of a recycled concrete aggregate (RCA) it can contain ionic species that reflect the nature and exposure history of the source concrete. Such species, like alkalis and chlorides, can have a chemical impact in the new concrete that is unlike that of natural aggregates that might otherwise be used.

One common deleterious durability concern in concrete, particularly one that can be relevant to the end of its service life, is alkali-silica reaction (ASR). Siliceous aggregates in the concrete undergo an expansive reaction with alkali hydroxides from the binder phase. Recycled concrete aggregates (RCA) produced from ASR-affected concrete can contain both reactive silica and additional alkalis either in the adhered mortar or from ASR gel already present in the RCA. The problem of alkali-silica reactions in recycled concrete is a challenge to manage since a shift in the gradation of reactive particles and concentration of alkalis (possibly through crushing of the concrete and/or dilution by changing the concrete to a component of a new concrete mix) can become closer to the pessimum content (a proportion that is an ideal balance between reactive silica and available alkali that will produce the highest expansion) in the recycled aggregate concrete (RAC) than in the original concrete.

The study of RCA produced from recycled concrete that had been affected by ASR has shown that it can be as deleteriously reactive as the siliceous limestone aggregate originally contained within the concrete. As with reactive aggregate, the expansion could be mitigated by replacing part of the cement in the binder with SCMs, albeit at greater levels than required for the original virgin reactive aggregate. Fine RCA was observed to be less reactive than coarse RCA likely due to a reduced proportion of reactive constituents in the small size fraction. Alkali silica reaction in concrete has also been observed to be induced by mortar adhered to recycled aggregate and the amount of adhered mortar can affect the level of reactivity in an aggregate. In limiting the impacts it has been observed that reducing the available alkalis appears to have a greater impact than reducing the calcium availability. There is a clear challenge to recycling ASR-affected or ASR-susceptible concrete for use as aggregates.

It has been established that deliberately pre-carbonating RCAs can improve both the quality of the aggregates and the mechanical properties of concrete produced with such aggregates. It is theorized that CaO from the binder combines with carbon dioxide to form $CaCO_3$ that precipitates in the pore space of the mortar component present in RCAs and improves the microstructure. The $CO_2$ treatment of recycled concrete aggregates has been observed to reduce the water absorption of the aggregates and reduce the transport properties of concrete (as measured by bulk electrical conductivity, chloride ion permeability and gas permeability) made with the aggregates as compared to untreated RCA.

The $CO_2$ treatment of a recycled concrete aggregate and its impact on chemical fluxes into and out of the treated mass may have some similarity to the $CO_2$ treatment of cement solidified wastes. It has been observed that $CO_2$ solidification of paste cylinders comprised of dried wastes (mainly heavy metal hydroxides) and cement greatly reduced the leachability of metals contained within the forms. It has been suggested that some metals can be preferentially incorporated in the silica-rich rims of decalcified cement grains, as in the calcite infilling porosity.

Described herein are the impacts of carbonating a recycled concrete aggregate, e.g., that is produced from mortar comprised of a reactive sand and a high-alkali cement. The alkali-silica reaction (ASR) in concrete occurs by reaction of reactive silica phases in the aggregate with alkali and hydroxide ions in the pore solution of the hydrating cement to produce a hydrous alkali silicate gel. The reaction depends not only on sufficient chemical driving forces (alkali concentration and the aggregate's reactivity) but also on the transport of alkali ions. If mobility of the alkali ions in the RCA adhered paste can be reduced, then expansive gel formation may be inhibited.

In general, the methods and compositions disclosed herein relate to treating cement products, such as concrete, where the cement has already hydrated, with carbon dioxide, then reusing the carbonated hydrated cement product. This can be, e.g., used as recycled aggregate, and for convenience this will be described herein. However, any carbonation of a hydrated cement product, then reuse of that cement product, is encompassed by the methods and compositions described herein. Thus, the recycled product may be concrete that is carbonated then recycled as aggregate, or some part of a concrete product that is carbonated then recycled. The carbonated cement product may be used in any suitable form, e.g., as an aqueous suspension, or as a dried component.

Any suitable method can be used to carbonate recycled aggregate. In certain embodiments, the aggregate is pre-treated prior to exposure to carbon dioxide. Any suitable pre-treatment can be used. In certain embodiments, the recycled concrete aggregate is processed to reduce its size and/or to provide a uniformly sized particle; for example the recycled concrete aggregate can be crushed, and can be further sized to provide pieces of aggregate for carbonation in a certain size range, for example 0.1 mm-200 mm, or 1 mm-100 mm, or 1 mm-50 mm, or 1 mm-40 mm, or 2 mm-30 mm, or 5 mm-20 mm; in certain cases, fine aggregate (e.g., aggregate of a size less than 1 mm) may be desired, with larger sizes being considered coarse aggregate; crushed aggregate can, e.g., be passed through a series of sieves to provide the desired size range. In certain cases, the aggregate used in certain methods and compositions of the invention can be classified as coarse and/or fine, as those terms are used in the art. For example, fine aggregate may be defined as aggregate nominally with a size less than 1 mm.

The recycled concrete aggregate can alternatively or in addition be pre-treated by exposure to air, for example air drying. The period of exposure to air can be any suitable period, for example 1-1000 hours, or 5-500 hours, or 10-200 hours, or 20-150 hours, or 50-100 hours, for example, about 24, 48, 72, or 96 hours.

The recycled concrete aggregate is exposed to carbon dioxide. Any suitable method of exposure may be used, and other conditions adjusted as appropriate.

The source of carbon dioxide may be any suitable source. Sources include air, for example direct air capture integrated into a processing setup or in close proximity to a suitable facility; industrially sourced carbon dioxide, such as merchant market, e.g., byproduct of ethanol, ammonia, or hydrogen productions; point source emissions such as power plants (e.g. coal-fired or natural gas-fired power plants) or cement plants; and/or engine exhaust from vehicles and machinery related to or in the vicinity of the treatment process. The source material is generally treated to concentrate carbon dioxide and render it into a form suitable for transportation to an aggregate treatment site and/or for treatment of the aggregate; in certain cases a source material, e.g., flue gas, may be used as is or with only minimal modification; this can be, e.g., flue gas from a cement plant, which is already high in carbon dioxide. For example, carbon dioxide may be extracted from the source material in a concentration of 10-100%, or 30-100%, or 50-100%, or 70-100%, or 80-100%, or 90-100%, or 95-100%, or 99-100%. In certain embodiments, the carbon dioxide is converted to liquid form for transport; transport of gaseous carbon dioxide is also possible. Carbon dioxide may be transported in any suitable manner, such as by pipeline, rail, truck, and the like.

In certain embodiments, the source of carbon dioxide comprises a cement plant; such plants produce high concentrations of carbon dioxide in flue gas due to both calcining and fuel combustion in the calcining process. The carbon dioxide, e.g., as extracted from the flue gas, may be used in a variety of manners related to concrete production (e.g., as detailed below), including carbonation of aggregates. In certain embodiments, carbon dioxide from a cement plant may be used in the production of concrete using the cement from the cement plant; in general, this reduces both transportation cost and carbon dioxide emission, as the carbon dioxide is transported a relatively short distance from the cement plant to the concrete production facility. The aggregates used in the production of the concrete may include recycled concrete aggregates, some or all of which are carbonated, e.g., as described herein; in certain embodiments the aggregates are carbonated using carbon dioxide from a cement plant, such as the cement plant producing the cement used in the concrete-producing facility. The recycled aggregates may be carbonated at a site in the concrete-producing facility or a separate site, or a combination thereof. In certain embodiments, one or both of cement used in the concrete and/or wash water from the concrete production may also be carbonated with carbon dioxide comprising carbon dioxide from a cement plant, e.g., the same plant as used to produce the cement, and used in the production of the concrete.

In certain embodiments, the recycled concrete aggregate is placed in an atmosphere in a suitable range of relative humidities, such as 30-80%, or 40-70%, or 50-70%, or 55-65%. The temperature for the carbonation may be any suitable temperature, e.g., 5-50, or 10-50, or 20-50, or 20-40 degrees C. The RCA can be exposed to carbon dioxide-enriched atmosphere, for example 0.1-100%, or 0.1-90%, or 0.1-70%, or 0.1-50%, or 0.1-20%, or 0.1-10%, or 0.5-20%, or 0.5-10%, or 0.5-5%, or 0.5-2% carbon dioxide. The exposure may be continuous or intermittent. The concentration of carbon dioxide during exposure may remain constant or may be altered at one or more times. The total time of exposure may be any suitable time, for example 1-1000 days, or 2-500 days, or 5-500 days, or 10-300 days, or 20-250 days, or 30-250 days, or 50-200 days, or 60-150 days, or 70-120 days, or 80-100 days. After carbonation, the RCA may be used in a concrete mix as is or with further treatment.

Carbonation of recycled concrete aggregates may be performed in any suitable facility. The facility may include one or more of a system for crushing and grading aggregate to the desired sizes and/or a system for transporting crushed and/or graded aggregates to the site; a source of carbon dioxide (e.g., as transported from any of the original sources described herein); a site for aggregate treatment; a system for delivering the carbon dioxide to the aggregate in the desired form and concentration and at the desired rate and time; various monitoring systems, e.g., sensors for one, two, three, four, five, six, or all of temperature, moisture content, pressure, agitation, carbon dioxide concentration at one or more locations, carbon dioxide crushing, time, carbon dioxide flow rate, and the like; a system for determining carbonation level of carbonated aggregates and, optionally, other concrete components including final concrete; and a control system. In certain embodiments, a plurality of aggregate carbonation sites may be connected in a network, e.g., a network with a common controller. Additionally or alternatively, in certain embodiments, a plurality of concrete production sites are connected to a common aggregate carbonation site, e.g., with a common controller. In certain embodiments, a plurality of concrete production sites is connected to a plurality of aggregate carbonation sites, e.g., with a common controller. Thus, in certain embodiments, 2, 3, 4, 5, 6, 7, 8, 9, 10, or more than 10 aggregate carbonation sites may be networked, e.g., under a common controller; 2, 3, 4, 5, 6, 7, 8, 9, 10, or more than 10 recycled aggregate production sites may be networked/connected to a single carbonation site; and/or 2, 3, 4, 5, 6, 7, 8, 9, 10, or more than 10 concrete production sites using carbonated RCA may be networked, e.g., under a common controller. The controller, either a controller at a single site or a network controller, or both, may be configured to learn, e.g., through machine learning, from one or more batches and apply the information to other batches; this can be, e.g., information from a first batch or set of batches that is applied to a second batch or set of batches by modifying the conditions of the second batch according information obtained from the first batch or batches. The second batch may be a subsequent batch or batches at the same facility and/or a batch or batches at a different facility than the first batch or batches. Inputs for learning can include concrete age, degree of hydration, proportion of paste, particle size, and/or any other suitable characteristic, such as those described herein. The controller can perform one or more optimization algorithms using the input data and produce output; e.g. instructions for appropriately modifying carbonation or other processes.

Carbonation of recycled concrete aggregates may be done as a batch process, for example a batch process in a sealed system. An aggregate vessel for treatment may be any suitable vessel; a series of vessels may be used depending on the exact treatment sequence. In certain embodiments, one or more of the vessels is a vessel retrofitted from its usual use in aggregate transport, storage, and the like; suitable vessels for retrofit include rail cars, silos, truck/trailer, huts, or a combination thereof. The carbonation of the aggregates will depend on pressure, moisture, temperature, time, and any other suitable factors. Used or returned concrete is transported to the site, and either treated at the site or before transport to produce crushed aggregate of suitable size for treatment. In certain cases it is desirable to perform tests on the aggregate to be treated to determine suitable treatment conditions. The crushed aggregate may be sorted by size, e.g., by sieving, before, during, and/or after treatment. For example, size of the aggregate may determine treatment conditions and suitable sized aggregate may be used in a given treatment protocol. The appropriate aggregate is situated in a first treatment vessel.

Carbon dioxide may be applied to the recycled concrete aggregate in any suitable form, typically gaseous, and in any suitable manner. Typically, initially the carbon dioxide is pressurized to some degree to allow flow through the aggregate. At a suitable point, the pressure is transferred to atmospheric pressure. Pressure can be monitored, e.g., by one or more pressure sensors; pressure drop with time may be monitored and, in some cases, controlled, e.g., to determine when to pass to a subsequent step of the process. Carbon dioxide may be applied in any suitable manner in order to expose the aggregate to carbon dioxide; for example, carbon dioxide may be applied at the bottom of a treatment vessel, under the mass of material, and fill the vessel as it is applied. In this and other cases, it can be useful to monitor carbon dioxide concentration at one or more locations, e.g., at the top of the vessel and/or at leak points in the vessel if it is not airtight, to indicate when the vessel is full of carbon dioxide; as carbon dioxide is used in the carbonation process, additional carbon dioxide may be added, e.g., to top off the vessel. Other additions of carbon dioxide may be performed as required or desired in the process. One or more agitation cycles may be used during the process to help with homogenization.

Moisture (humidity) is generally an important factor in carbonation of recycled concrete aggregate, and typically process systems will monitor moisture in the process vessel and adjust to keep it in a desired range, e.g., an optimal range. To increase humidity, moisture may be added directly to the chamber. This can occur in any suitable manner; for example, moisture may be added during an agitation cycle, as part of a gas injection, or both. The amount of moisture to supply in a gas injection may be determined, e.g., based on the existing chamber humidity. To decrease moisture, any suitable method may be used, e.g., a desiccation loop to remove water from the system where moist gas is removed from the vessel, moved through the loop, and sent back to the vessel as drier gas. Different levels of humidity may be useful at different points in the process and thus humidity may be varied, continuously or in steps. Thus, humidity may be adjusted to a first value at a first time, a second value at a second time, etc., as appropriate for the process. The times for humidity change may be predetermined or may determined based on one or more characteristics of the process.

Temperature can also be an important factor in carbonation processes. The carbonation process is exothermic and the carbonation reaction causes the temperature to rise. If cooling is desired, it may be achieved in any suitable manner, such as an air loop with a heat exchanger (which may be the same loop as for humidity control or a different loop), and/or external cooling of the treatment vessel, and the like. Carbon dioxide has a higher solubility in water at lower temperatures, so it is generally desirable to control temperature rise; it may even be desirable to cool the reaction vessel below ambient temperature. Temperature can be controlled in a range to increase, e.g., maximize, uptake and/or reduce process time. In certain cases, as when unprocessed flue gas is used, for example, from a cement plant, a higher temperature may be used due to the high temperature of the flue gas; the flue gas may, in some cases, be cooled as appropriate for use in the system. Temperature in the system can be monitored with one or more sensors at suitable locations, such as on the interior and/or exterior surface of the vessel, in the gas mixture inside the vessel and/or in a gas loop exterior to the vessel, and the like. Temperature can also be used as an indicator of the extent and/or rate of the carbonation process.

Any suitable treatment logic may be used. In certain cases, one or more, or all, conditions are predetermined and the treatment runs on a set course. In general, however, it is useful to monitor one or more characteristics of the system and treatment and to adjust as desired to modulate the process to increase efficiency and/or uptake. For example, as described above, temperature and moisture may be monitored with appropriate sensors and one or both adjusted as appropriate. Carbon dioxide may be monitored. Carbon dioxide content at various locations in the system may be monitored as described above. Additionally or alternatively, gas flow input/output can be monitored, for example, using a gas loop that only moves pressurized air to allow for moisture and temperature control. Generally, carbon dioxide absorption is expected to be high at first and taper off with time. A controller receiving inputs as to carbon dioxide flow rate, pressure, and/or content can modify carbon dioxide input according to changes indicative of carbon dioxide absorption. E.g., the carbon dioxide content in gas phase/pressure of carbon dioxide as it changes with time may be monitored. The rate of change of gas concentration can be associated with reaction rate. Additionally or alternatively, heat release as indicated by temperature can be associated with uptake rate/reaction rate. A controller may use one or more of these characteristics to determine suitable changes in, e.g., gas flow rate, temperature, humidity, and/or other suitable factors. The process end point may be predetermined, or may by indicated by a change in reaction rate, e.g., a predetermined change in reaction rate. The process end point may be at any suitable time. In certain cases, the process endpoint is determined based on projected level of carbon dioxide uptake, e.g., at a projected level of 20-100% maximum, such as 50-100% maximum, or 80-100% maximum. It will sometimes be the case that a more efficient carbonation operation is achieved with an uptake below 100% maximum, such as less than 99, 98, 97, 95, 92, 90, 85, 80, 75, 70, 65, 60, 55, 50, 45, 40, 35, 30, 25, 20, 15, 10, or 5% of maximum.

Carbonation of RCA may be achieved in an open flow through system. Such a flow through system may include one or more of a rotating packed bed, and/or conveyor belt, which can provide residence time, with, e.g., carbon dioxide gas flowing up through the belt. Treatment logic can include parameters as described above.

Systems and processes for carbonation of RCA may be implemented in a number of different ways. For example, carbonation can occur at one or more of crushing and grading/classification of recycled concrete. Input can be returned or end of service life concrete and the output can be treated aggregates. Carbon dioxide can be applied during the crushing process, optionally with additional agitation, e.g, to open up fresh surfaces for carbonation. Additionally or alternatively, carbon dioxide can be applied before, during, and/or after classification of the crushed concrete. In certain cases, fractions of the crushed concrete, such as undersize fractions, can be cycled into the next stream. In certain cases different size fractions are treated differently. Carbonation operations, with or without crushing operations, may be performed in a modular unit; such a unit may be easily integrated into existing aggregate recycling operations. The carbonated aggregates may be used on site and/or transported to an appropriate facility for use, generally a concrete-producing facility or other suitable facility for use of recycled concrete aggregates.

It is often desirable to determine the extent of carbonation of a concrete product, e.g., carbonated RCA as described herein, or concrete made with carbonated RCA. For the RCA, extent of carbonation may be determined by one or more of estimation, based on carbon dioxide gas content and flow measurements during the carbonation process and direct measurement. Techniques to measure the extent carbonation are well known in the art. Carbonation may be expressed as amount of carbon dioxide taken up per appropriate unit of mass, such as, in the case of carbonated RCA, weight of the aggregate, or, in the case of concrete produced using the carbonated RCA, per cubic meter, cubic yard, ton, or any other suitable unit of measure of concrete. In the latter case, other sources of carbon dioxide uptake, such as treatment of the wet concrete mix and/or carbonation of some or all of the mix water used in the concrete, such as carbonated wash water, may be added into the total amount of carbon dioxide sequestered in the concrete.

The usual use of recycled concrete aggregates is in subsequent concrete production, and carbonated RCA may be used in these operations. In certain embodiments, carbonated RCA are used in the production of concrete, replacing ordinary aggregate in a certain proportion. Either coarse, fine, or both coarse and fine aggregates can be replaced. The proportion of aggregate that is carbonated RCA used in a given concrete batch can be any suitable proportion, such as 0.1-99.5, 0.1-90, 0.1-80, 0.1-70, 0.1-60, 0.1-55, 0.1-50, 0.1-45, 0.1-40, 0.1-35, 0.1-30, 0.1-25, 0.1-20, 0.1-15, 0.1-10, 0.1-5, 0.5-90, 0.5-80, 0.5-70, 0.5-60, 0.5-55, 0.5-50, 0.5-45, 0.5-40, 0.5-35, 0.5-30, 0.5-25, 0.5-20, 0.5-15, 0.5-10, 0.5-5, 2-90, 2-80, 2-70, 2-60, 2-55, 2-50, 2-45, 2-40, 2-35, 2-30, 2-25, 2-20, 2-15, 2-10, 2-5, 5-90, 5-80, 5-70, 5-60, 5-55, 5-50, 5-45, 5-40, 5-35, 5-30, 5-25, 5-20, 5-15, 5-10, 10-90, 10-80, 10-70, 10-60, 10-55, 10-50, 10-45, 10-40, 10-35, 10-30, 10-25, 10-20, 10-15, 20-90, 20-80, 20-70, 20-60, 20-55, 20-50, 20-45, 20-40, 20-35, 20-30, 20-25, 30-90, 30-80, 30-70, 30-60, 30-55, 30-50, 30-45, 30-40, 30-35, 40-90, 40-80, 40-70, 40-60, 40-55, 40-50, 40-45, 50-90, 50-80, 50-70, 50-60, or 50-55%, for example 0.5 to 95%, or 0.5-90%, or 20-100%, or 10-95% of the aggregate. In certain embodiments, 0.1-99.5, 0.1-90, 0.1-80, 0.1-70, 0.1-60, 0.1-55, 0.1-50, 0.1-45, 0.1-40, 0.1-35, 0.1-30, 0.1-25, 0.1-20, 0.1-15, 0.1-10, 0.1-5, 0.5-90, 0.5-80, 0.5-70, 0.5-60, 0.5-55, 0.5-50, 0.5-45, 0.5-40, 0.5-35, 0.5-30, 0.5-25, 0.5-20, 0.5-15, 0.5-10, 0.5-5, 2-90, 2-80, 2-70, 2-60, 2-55, 2-50, 2-45, 2-40, 2-35, 2-30, 2-25, 2-20, 2-15, 2-10, 2-5, 5-90, 5-80, 5-70, 5-60, 5-55, 5-50, 5-45, 5-40, 5-35, 5-30, 5-25, 5-20, 5-15, 5-10, 10-90, 10-80, 10-70, 10-60, 10-55, 10-50, 10-45, 10-40, 10-35, 10-30, 10-25, 10-20, 10-15, 20-90, 20-80, 20-70, 20-60, 20-55, 20-50, 20-45, 20-40, 20-35, 20-30, 20-25, 30-90, 30-80, 30-70, 30-60, 30-55, 30-50, 30-45, 30-40, 30-35, 40-90, 40-80, 40-70, 40-60, 40-55, 40-50, 40-45, 50-90, 50-80, 50-70, 50-60, or 50-55%, for example 0.5 to 95%, or 0.5-90%, or 20-100%, or 10-95% of the coarse aggregate used in a given batch of concrete is replaced with carbonated RCA. In certain embodiments, 0.1-99.5, 0.1-90, 0.1-80, 0.1-70, 0.1-60, 0.1-55, 0.1-50, 0.1-45, 0.1-40, 0.1-35, 0.1-30, 0.1-25, 0.1-20, 0.1-15, 0.1-10, 0.1-5, 0.5-90, 0.5-80, 0.5-70, 0.5-60, 0.5-55, 0.5-50, 0.5-45, 0.5-40, 0.5-35, 0.5-30, 0.5-25, 0.5-20, 0.5-15, 0.5-10, 0.5-5, 2-90, 2-80, 2-70, 2-60, 2-55, 2-50, 2-45, 2-40, 2-35, 2-30, 2-25, 2-20, 2-15, 2-10, 2-5, 5-90, 5-80, 5-70, 5-60, 5-55, 5-50, 5-45, 5- 40, 5-35, 5-30, 5-25, 5-20, 5-15, 5-10, 10-90, 10-80, 10-70, 10-60, 10-55, 10-50, 10-45, 10-40, 10-35, 10-30, 10-25, 10-20, 10-15, 20-90, 20-80, 20-70, 20-60, 20-55, 20-50, 20-45, 20-40, 20-35, 20-30, 20-25, 30-90, 30-80, 30-70, 30-60, 30-55, 30-50, 30-45, 30-40, 30-35, 40-90, 40-80, 40-70, 40-60, 40-55, 40-50, 40-45, 50-90, 50-80, 50-70, 50-60, or 50-55%, for example 0.5 to 95%, or 0.5-90%, or 20-100%, or 10-95% of the fine aggregate used in a given batch of concrete is replaced with carbonated RCA. The carbonated RCA may be carbonated at the concrete production site, at a different site and transported to the concrete production site, or a combination thereof. In the former case, flue gas from a cement plant producing cement used in the concrete may be a source of some or all of the carbon dioxide used in carbonation. The carbonated RCA may be used in combination with other carbonation techniques. For example, in certain embodiments, concrete is produced using carbonated RCA and using one or both of carbonation of the wet concrete mix or carbonation of mix water, for example, using carbonated wash water, where the wash water is typically wash water produced in the course of concrete production, transportation, and use. Carbonation of wet concrete mixes is described in detail in U.S. Patent Publication No. 20160272542.

In certain embodiments, a concrete mix is produced using a combination of carbonated RCA and carbonation of the wet concrete mix (which carbonates cement in the mix). Proportions of carbonated RCA in the mix may be as given above. The wet mix may be exposed to carbon dioxide while mixing at any suitable concentration, such as not more than 3%, 2%, 1.5%, 1.2%, 1%, 0.8%, 0.7%, 0.6%, 0.5%, 0.4%, 0.3%, 0.2%, 0.1%, or 0.05% bwc (by weight cement) and/or at least 0.005, 0.01, 0.05, 0.1, 0.2, 0.3, 0.4, 0.5, 0.6, 0.7, 0.8, 0.9, 1.0, 1.1, 1.2, 1.3, 1.4, 1.5, 1.7, 2.0, 2.5% bwc, such as a dose of 0.01-3%, 0.01-2%, 0.01-1.5%, 0.01-1.2%, 0.01-1%, 0.01-0.8%, 0.01-0.6%, 0.01-0.5%, 0.01-0.4%, 0.01-0.3%, 0.01-0.2%, or 0.01-0.1% bwc, or a dose of 0.02-3%, 0.02-2%, 0.02-1.5%, 0.02-1.2%, 0.02-1%, 0.02-0.8%, 0.02-0.6%, 0.02-0.5%, 0.02-0.4%, 0.02-0.3%, 0.02-0.2%, or 0.02-0.1% bwc, or a dose of 0.04-3%, 0.04-2%, 0.04-1.5%, 0.04-1.2%, 0.04-1%, 0.04-0.8%, 0.04-0.6%, 0.04-0.5%, 0.04-0.4%, 0.04-0.3%, 0.04-0.2%, or 0.04-0.1% bwc, or a dose of 0.06-3%, 0.06-2%, 0.06-1.5%, 0.06-1.2%, 0.06-1%, 0.06-0.8%, 0.06-0.6%, 0.06-0.5%, 0.06-0.4%, 0.06-0.3%, 0.06-0.2%, or 0.06-0.1% bwc, or a dose of 0.1-3%, 0.1-2%, 0.1-1.5%, 0.1-1.2%, 0.1-1%, 0.1-0.8%, 0.1-0.6%, 0.1-0.5%, 0.1-0.4%, 0.1-0.3%, or 0.1-0.2% bwc. The carbon dioxide may be delivered to the wet concrete mix in any form, such as a mixture of solid and gaseous carbon dioxide, typically produced by letting liquid carbon dioxide be exposed to reduced pressure, such as atmospheric pressure. The final level of carbonation of the cement in the concrete mix depends on the efficiency of carbonation. Exemplary levels of carbonation of the cement in the concrete mix include 0.005-5%, 0.005-3%, 0.005-2%, 0.005-1%, 0.005-0.5%, 0.005-0.3%, 0.005-0.2%, 0.005-0.1%, 0.005-0.05%, 0.005-0.01%, 0.01-5%, 0.01-3%, 0.01-2%, 0.01-1%, 0.01-0.5%, 0.01-0.3%, 0.01-0.2%, 0.01-0.1%, 0.01-0.05%, 0.05-5%, 0.05-3%, 0.05-2%, 0.05-1%, 0.05-0.5%, 0.05-0.3%, 0.05-0.2%, 0.05-0.1%, 0.1-5%, 0.1-3%, 0.1-2%, 0.1-1%, 0.1-0.5%, 0.1-0.3%, 0.1-0.2%, for example, 0.05-5%, such as 0.05-1%, in some cases 0.05-0.5%.

In certain embodiments, a concrete mix is produced using a combination of carbonated RCA and carbonation of mix water used in the wet concrete mix. Proportions of carbonated RCA in the mix may be as given above. The mix water may be carbonated in any suitable manner. In certain embodiments, the mix water contains carbonated wash water, such as wash water produced in the concrete production site during production, transport, and use of the concrete made at the site. Carbonation of concrete wash water is described in detail in PCT Publication No. WO2018232507. Any suitable portion of the mix water may be carbonated water, such as carbonated wash water, e.g., 1-100, 1-80, 1-70, 1-60, 1-50, 1-40, 1-20, 1-10, 1-5, 5-100, 5-80, 5-70, 5-60, 5-50, 5-40, 5-20, 5-10, 5-5, 10-100, 10-80, 10-70, 10-60, 10-50, 10-40, 10-20, 30-100, 30-80, 30-70, 30-60, 30-50, 30-40, 50-100, 50-80, 50-70, 50-60%, such as 1-100%, for example 1-80%, in some cases 1-50%.

In certain embodiments, a concrete mix is produced using a combination of carbonated RCA, carbonation of the wet concrete mix, and carbonation of mix water used in the wet concrete mix. Proportions of each of the components in the wet mix, and dose of carbon dioxide used in treating the wet mix, can be any suitable proportion as described above. Compositions of the invention include compositions produced by any of these methods, including wet concrete mix comprising carbonated RCA, wet concrete mix comprising carbonated RCA and carbonated cement, wet concrete mix comprising carbonated RCA and carbonated mix water, such as mix water comprising carbonated wash water, and wet concrete mix comprising carbonated RCA, carbonated cement, and carbonated mix water, such as mix water comprising carbonated wash water.

The carbon dioxide used to produce carbonated RCA, carbonating the wet mix, and/or carbonating wash water, may be from any suitable source, e.g., sources as described herein. In certain embodiments, the source of some or all of the carbon dioxide used for one or more of RCA, wet mix carbonation, or wash water carbonation, is flue gas from a cement producing facility; such flue gas may be used as is, minimally treated, and/or treated to increase carbon dioxide content and/or change the state of carbon dioxide, e.g., liquefy the carbon dioxide. In certain embodiments, the source of some or all of the carbon dioxide used for one or more of RCA, wet mix carbonation, or wash water carbonation, is flue gas from a cement producing facility that produces the cement used in the wet concrete mix.

Provided herein are systems for producing and/or utilizing carbonated RCA. In certain embodiments, provided herein is a system that includes a source of carbon dioxide operably connected to a facility that comprises recycled concrete aggregates and a system for delivering the carbon dioxide to the aggregates. The facility the comprises RCA may be a facility that produces and/or stores the RCA. The system is configured so that the carbon dioxide may be delivered at any appropriate stage of the production and/or storage of the RCA and in any appropriate manner, as described herein. The source of carbon dioxide may be any suitable source, as described herein; for example, the source may be a power plant or a cement plant, and the carbon dioxide may be, optionally, treated (e.g., concentrated and/or liquified) and transported to the RCA site. In this case the system includes a transportation system for transporting the carbon dioxide from its ultimate source to the site of RCA carbonation and, optionally, a treatment system to render the source material in suitable form. The system can be retrofitted using existing facilities, e.g., using existing aggregate storage facilities as treatment sites. The system may be a modular system, e.g., a system suitable for transport to an existing concrete recycling site. In certain cases, the system is built as a stand-alone system. Appropriate sensors and control mechanisms can be included, such as carbon dioxide sensors, flow rate sensors, temperature sensors, moisture sensors, pressure sensors, etc., operably connected to a controller, as described more fully elsewhere herein. In certain embodiments, more than one system is operably connected to a central controller in a network; alternatively or additionally, a plurality of recycled aggregate producers can be connected to a central carbonation facility with a controller for the central facility, as described further herein. Networking can also include networking of concrete production facilities, as described in U.S. Patent Publication No. 20160272542. The system may further include a concrete producing facility that uses carbonated RCA produced in the RCA carbonation system in concrete produced at the concrete producing facility. A transportation system for transporting the carbonated RCA to the concrete producing facility may be included. In certain embodiments, the concrete producing facility is configured to deliver carbon dioxide to wet concrete mix produced at the facility; in certain embodiments, the system includes a system to delivery carbon dioxide in a desired form and dose to the wet concrete mix, such as a system to convert liquid carbon dioxide to solid and gaseous carbon dioxide which is delivered to the mixing wet concrete mix. The source of the carbon dioxide delivered to the mixing concrete may be the same as or different from the source for carbonating RCA. In certain embodiments, the concrete producing facility is configured to deliver mix water to a concrete mix where the mix water includes carbonated water, such as carbonated wash water, e.g., wash water produced at the facility and/or during transportation and use of the concrete produced at the facility; in certain embodiments, the system includes a system to carbonate wash water produced by the facility and/or in transport and use of concrete produced at the facility. The source of carbon dioxide to carbonate water, e.g., wash water, may be the same as or different from the source of carbon dioxide to carbonate RCA. In certain embodiments, the same source of carbon dioxide is used for carbonation of RCA and carbonating mixing wet concrete and/or carbonating water such as wash water; in certain embodiments, the source of carbon dioxide includes a cement plant, such as a cement plant that produces cement used in the concrete mix produced at the concrete producing facility. In certain embodiments, the system includes a carbonation determination system, to determine the level of carbonation of one or more of the components of the concrete mix (RCA, cement, and/or mix water) and/or the final mix, and/or hardened concrete from the mix. The carbonation determination system may use estimates (based on, e.g., carbon dioxide delivery, treatment time, and the like), direct measurement by methods known in the art, or a combination thereof. If the system is part of a network, the carbonation determination system may be in communication with other such systems from other concrete producing sites.

EXAMPLES

Example 1

A study was conducted using recycled concrete aggregate (RCA) produced from crushing mortar containing a highly-reactive (Jobe) sand and a high-alkali cement. Mortar was produced using highly reactive Jobe aggregate and high-alkali cement (1.12% $Na_2Oe$). Mortar prisms were produced then seal-cured in plastic bags for 3 months. The mortar was crushed to produce coarse aggregate in the size range from 5 to 20 mm. The coarse aggregate was then subjected to three different treatments: 1) No treatment; 2) stored in 30% $LiNO_3$ for 28 days; 3) stored at 55-65% RH in a $CO_2$-enriched atmosphere (1% $CO_2$) for 91 days. See FIG. 1 for the apparatus used for the carbonation treatment. Concrete samples were then produced with the carbonated RCA (RCA-CO2) and non-carbonated RCA (RCA-ASR). The binder used in the concrete was a blend of 80% low-alkali cement plus 20% fly ash. This blended cement has been shown to be effective in preventing ASR expansion when used with the Jobe aggregate. Concrete prisms containing RCA-ASR expanded significantly (0.162% in 2 years) when stored over water in sealed containers at 38° C. whereas concrete produced with RCA-CO2 did not (<0.040% at 2 years). See FIGS. 2 and 3. Without being bound by theory, it is thought that, in the case of the uncarbonated RCA, there is a sufficient concentration of alkali hydroxides within the mortar portion of the RCA to fuel ASR with the reactive silica in the sand particles. However, in the carbonated RCA the concentration of alkali hydroxides is significantly reduced by the carbonation process and this prevents ASR expansion despite the abundance of reactive silica present in the RCA.

Materials

A high-alkali (HA) and low-alkali (LA) Portland cement, and a single source of low-calcium fly ash (FA) were used in the study; the chemical composition of the cementing materials is given in Table 1. A single source of highly-reactive sand (JB) was used in the study. Concrete mixtures incorporated either a non-reactive siliceous gravel (NC) or a non-reactive natural river sand (NF). A solution of 30% lithium nitrate (LN) was used.

TABLE 1

| Composition of cementing materials | | | | | | | | | |
|---|---|---|---|---|---|---|---|---|---|
| | $SiO_2$ | $Al_2O_3$ | $Fe_2O_3$ | CaO | MgO | $Na_2O$ | $K_2O$ | $SO_3$ | $Na_2Oe$ |
| HAPC | 19.6 | 5.33 | 2.12 | 61.8 | 2.36 | 0.30 | 1.24 | 4.17 | 1.12 |
| LAPC | 21.6 | 4.81 | 2.10 | 62.1 | 2.43 | 0.22 | 0.36 | 3.41 | 0.46 |
| FA | 48.5 | 19.0 | 13.6 | 5.24 | 2.26 | 2.52 | 1.87 | 2.45 | 3.75 |

Production and Treatment of Recycled Concrete Aggregate (RAC)

Prisms (75×75×300 mm) were cast using a mortar produced with high-alkali Portland cement (HA) and Jobe sand (JB) using sand:cement:water=3:1:0.5. The prisms were sealed in plastic bags and stored at 23° C. for 3 months. The mortar prisms were then fractured into chunks using a hammer and the chunks passed through a jaw crusher to reduce the particle size to pass a 20-mm sieve. The sub-20 mm material was screened on a 5-mm sieve to remove the fine fraction. The 20-5 mm material was used for all testing and was identified as RJC. The 20-5 mm material was air-dried in the laboratory prior to one of the following treatments: RJC: untreated recycled Jobe-concrete aggregate; RJC-LN: RJC immersed in 30%-$LiNO_3$ solution for 28 days; RJC-CO2: RJC aggregate stored at 55 to 65% RH in a $CO_2$-enriched atmosphere (1% $CO_2$) for 91 days. A schematic of the carbonation chamber is shown in FIG. 1.

2.3 Testing of RCA for Alkali-Silica Reaction (ASR)

The Jobe sand (JB), the untreated RCA (RJC) and the treated RAC (RJC-LN and RJC-CO2) were tested using the concrete prism test (ASTM C1293). Briefly, this test involves producing concrete prisms (75×75 mm×250-mm gauge length) that are fitted with stainless-steel inserts at the ends to allow length-change measurements to be made. The prisms are stored over water in sealed containers stored at 38° C. and are periodically removed to determine changes in length and mass. The concrete mix design incorporates 420 kg/m$_3$ of cementing material and w/cm in the range of 0.42 to 0.45. The cementing material was comprised of either 100% high-alkali cement, designated HA, or a combination of 80% low-alkali cement plus 20% fly ash, designated LAFA. Note that none of the concrete mixtures used in this study were boosted with NaOH during mixing. Table 2 presents the concrete mixtures that were tested in this study.

TABLE 2

Composition of Concrete Prism Tests

| Mix ID | Cementing Material | Reactive Aggregate | Non-Reactive Aggregate |
|---|---|---|---|
| HA-JB | HA Cement | JB Sand | Non-Reactive Coarse |
| LAFA-JB | LA Cement + Fly Ash | | |
| HA-RJC | HA Cement | RJC untreated | Non-Reactive Fine |
| LAFA-RJC | LA Cement + Fly Ash | | |
| HA-RJC-CO2 | HA Cement | RJC Carbonated | |
| LAFA-RJC-CO2 | LA Cement + Fly Ash | | |
| LAFA-RJC-LN | LA Cement + Fly Ash | RJC Lithium-Treated | |

Results

Concrete with Jobe Sand

Figure 2:
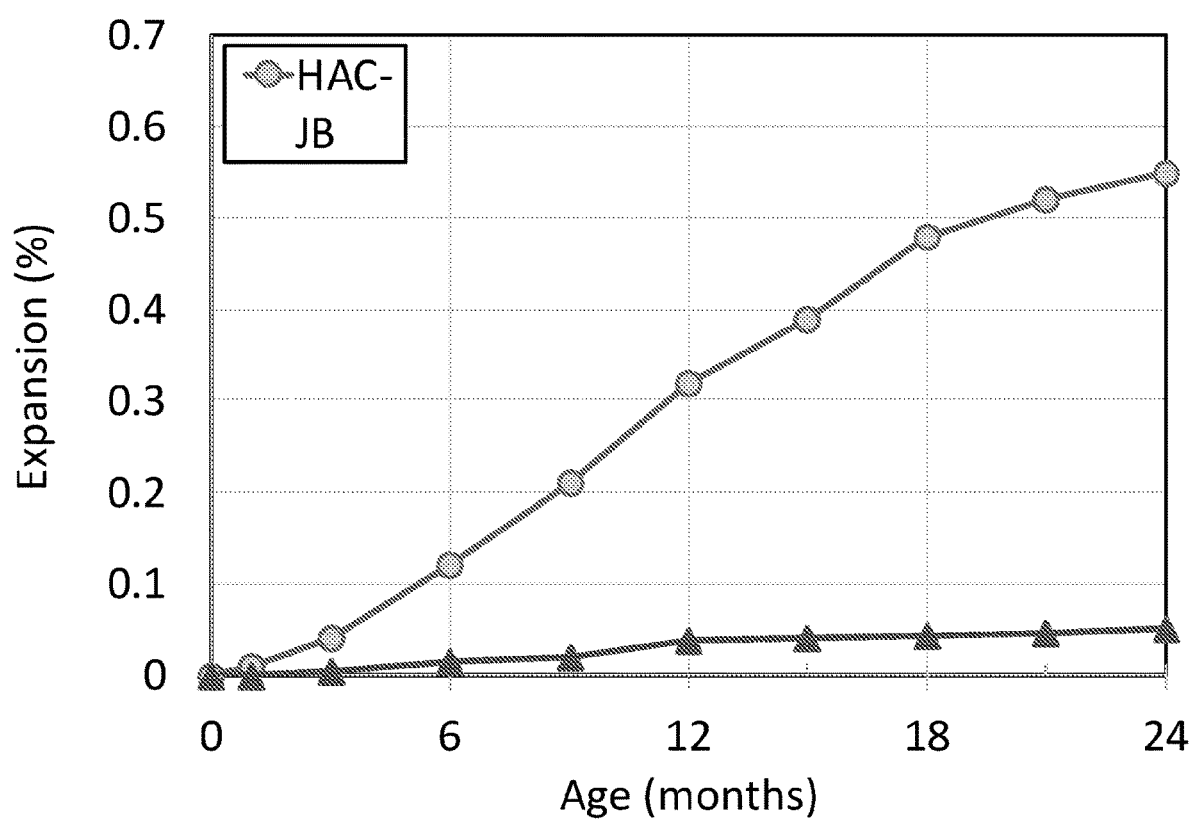
FIG. 2 shows expansion of concrete prisms stored over water at 38 degrees C. Non-reactive coarse aggregate and Jobe sand.

FIG. 2 shows the expansion of the concrete prisms containing alkali-silica reactive Jobe sand and non-reactive coarse aggregate. As expected the concrete containing high-alkali (HA) cement expanded very rapidly showing deleterious levels of expansion (>0.04%) and cracking after just 3 months; the total expansion at 2 years was 0.550%. The concrete produced with Jobe sand in combination with low-alkali (LA) cement and fly ash (FA) did not exhibit deleterious expansion (>0.04%) throughout the two-year period (0.039% at 2 years).

Concrete with Untreated Recycled Concrete Aggregate (RJC)

Figure 3:
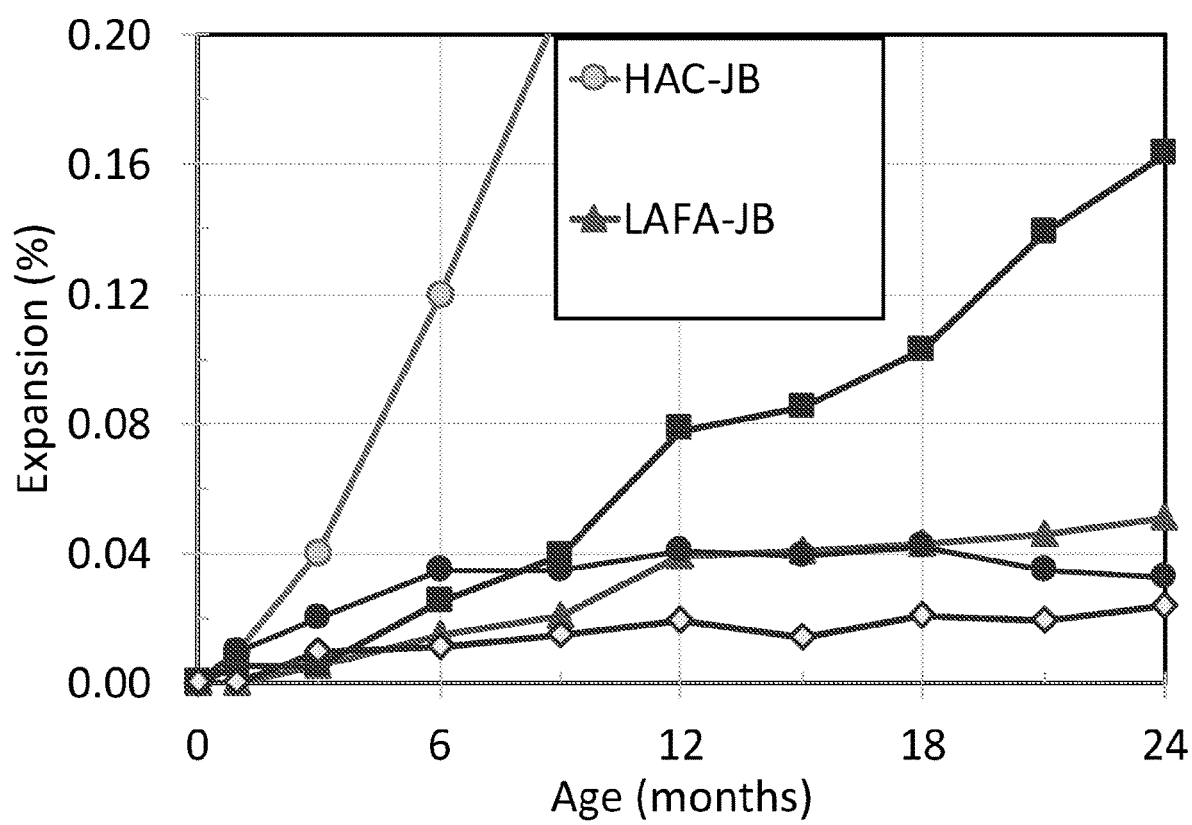
FIG. 3 shows expansion of concrete prisms stored over water at 38 degrees C. Non-reactive coarse aggregate and Jobe sand, recycled-concrete-coarse-aggregate non-reactive sand

FIG. 3 shows the expansion of concrete prisms produced with the untreated RJC material as the coarse aggregate and a non-reactive fine aggregate. Concrete containing the RJC and HA cement expanded rapidly but compared with the mix with HA cement and Jobe sand, the rate of expansion was slower and the ultimate expansion was less. The concrete with the RJC material and the low-alkali cement/fly ash combination (LAFA) also expanded but to a lesser degree than with the HA cement.

Concrete with Carbonated Recycled Concrete Aggregate (RJC-CO2)

Figure 4:
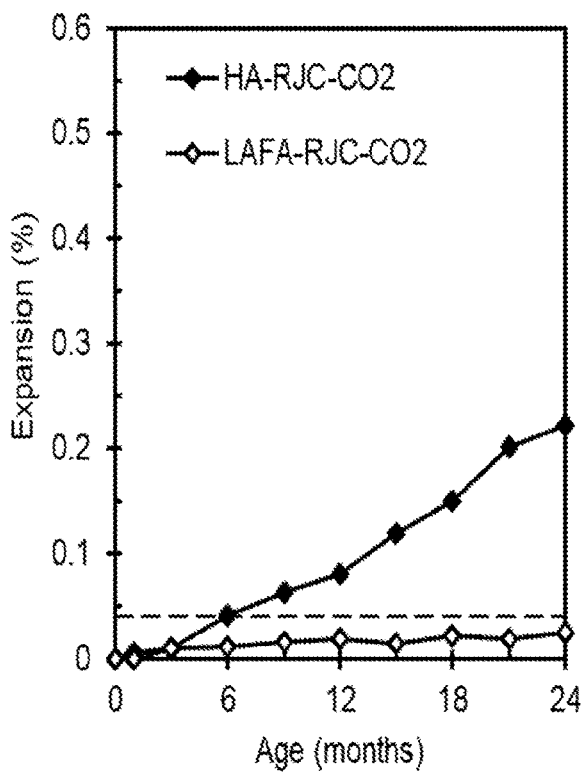
FIG. 4 shows the results for concrete produced with the carbonated RJC material (RJC-CO2) as the coarse aggregate and a non-reactive fine aggregate.

FIG. 4 shows the results for concrete produced with the carbonated RJC material (RJC-CO2) as the coarse aggregate and a non-reactive fine aggregate. Concrete with HA cement did show some expansion which was significantly lower than the other concretes with HA cement. The concrete produced with the LAFA combination did not exhibit deleterious expansion throughout the 2-year period; the expansion at 2 years was just 0.024% and there was no evidence of surface cracking at that time.

Concrete with Lithium-Treated Recycled Concrete Aggregate (RJC-LN)

Figure 5:
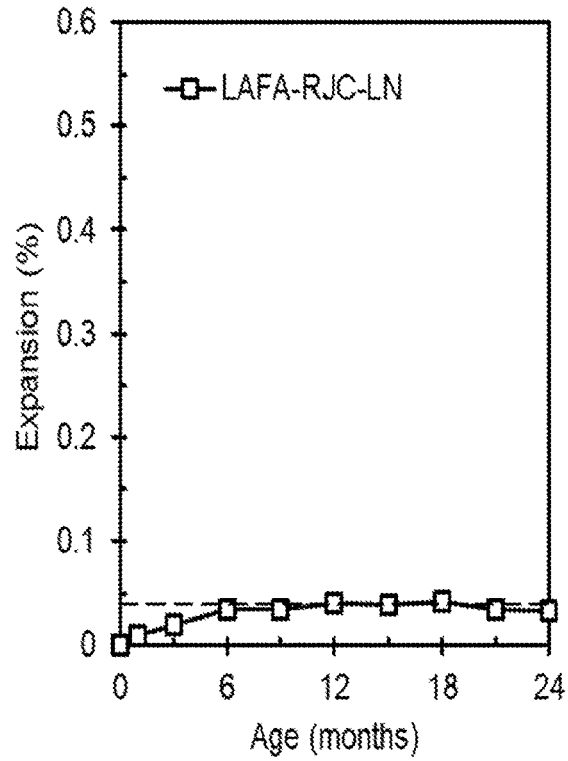
FIG. 5 shows expansion data for the lithium-treated RJC aggregate (RJC-LN) and the 80/20 combination of LA cement/fly ash (LAFA)

FIG. 5 shows expansion data for the lithium-treated RJC aggregate (RJC-LN) and the 80/20 combination of LA cement/fly ash (LAFA). The concrete showed a small amount of deleterious expansion, 0.042%, at 18 months and this was accompanied by very faint surface cracks measuring approximately 0.1 mm in width. The expansion did not increase beyond this amount with further exposure; indeed, the 2-year expansion was slightly lower at 0.033%. Unfortunately, there are no results for the combination of HA cement and RJC-LN

DISCUSSION

The data show that the use of recycled concrete aggregate produced from ASR-affected concrete can lead to expansion and cracking of new concrete unless the aggregate is treated. Previous workers have shown that such expansion can be prevented by using suitable amounts of pozzolans, but that the amounts required are more than that needed for virgin reactive aggregate. In the case studied here, expansion was observed even when the binder was comprised of a low-alkali cement (0.46% $Na_2Oe$) in combination with 20% of a low-calcium fly ash. This same cementitious material combination (LAFA) did not lead to expansion and cracking of the concrete with the virgin Jobe aggregate.

Figure 6:
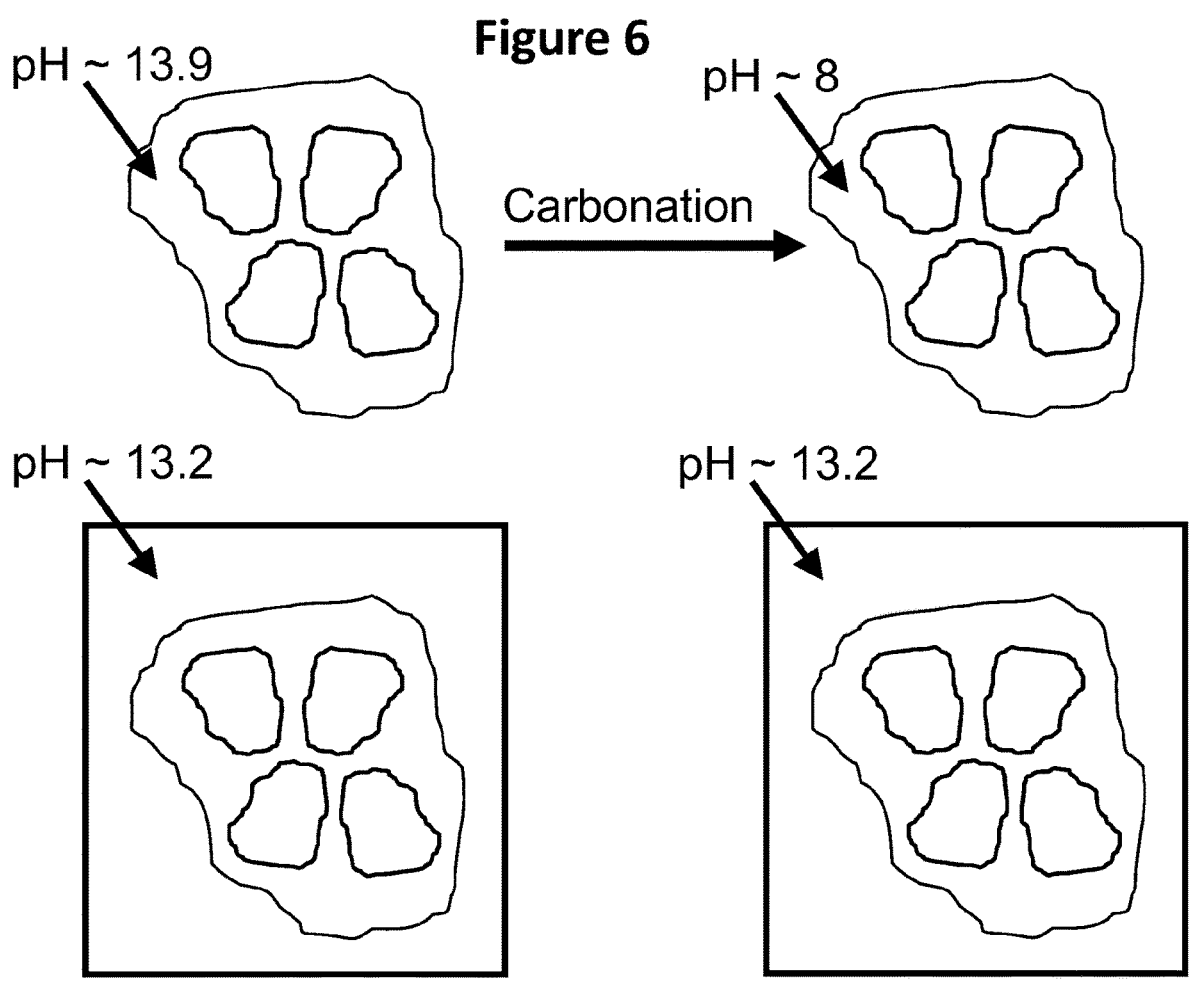
FIG. 6 shows a schematic of the RJC (upper left) and the fresh concrete produced with the RJC (upper right)
Figure 7:
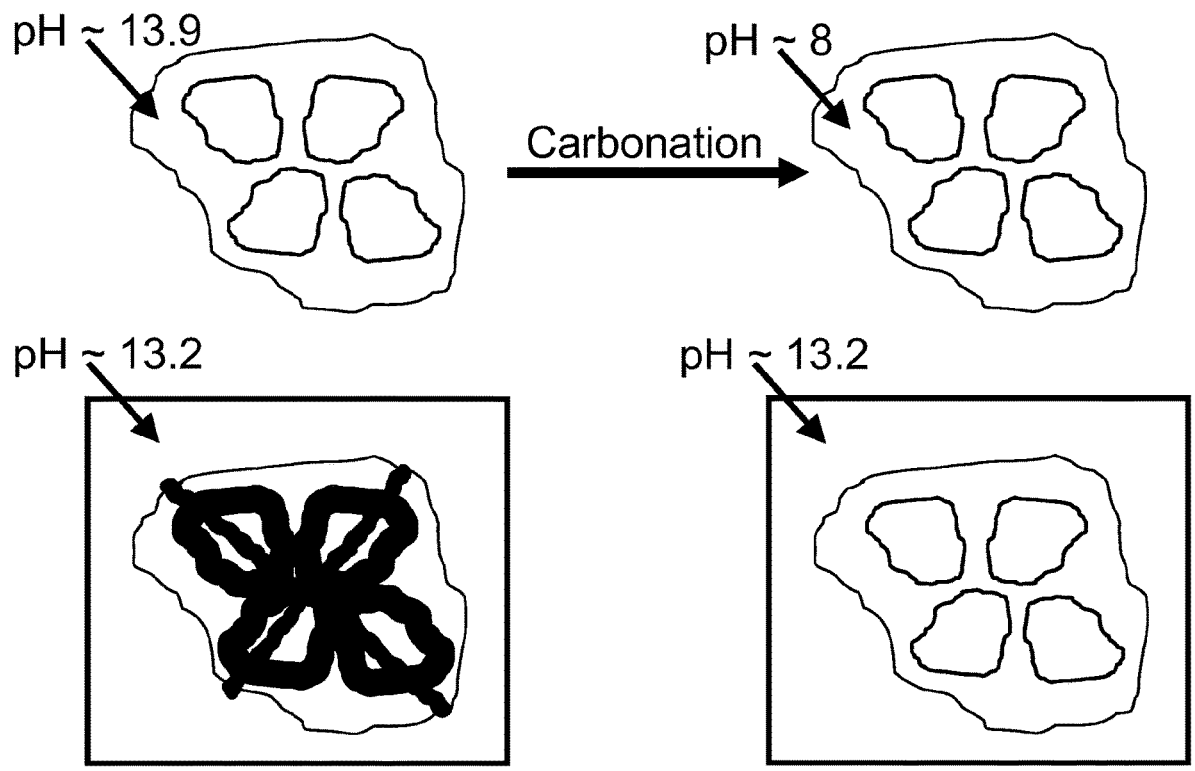
FIG. 7 shows another aspect of carbonated vs. non-carbonated recycled concrete aggregate
Figure 8:
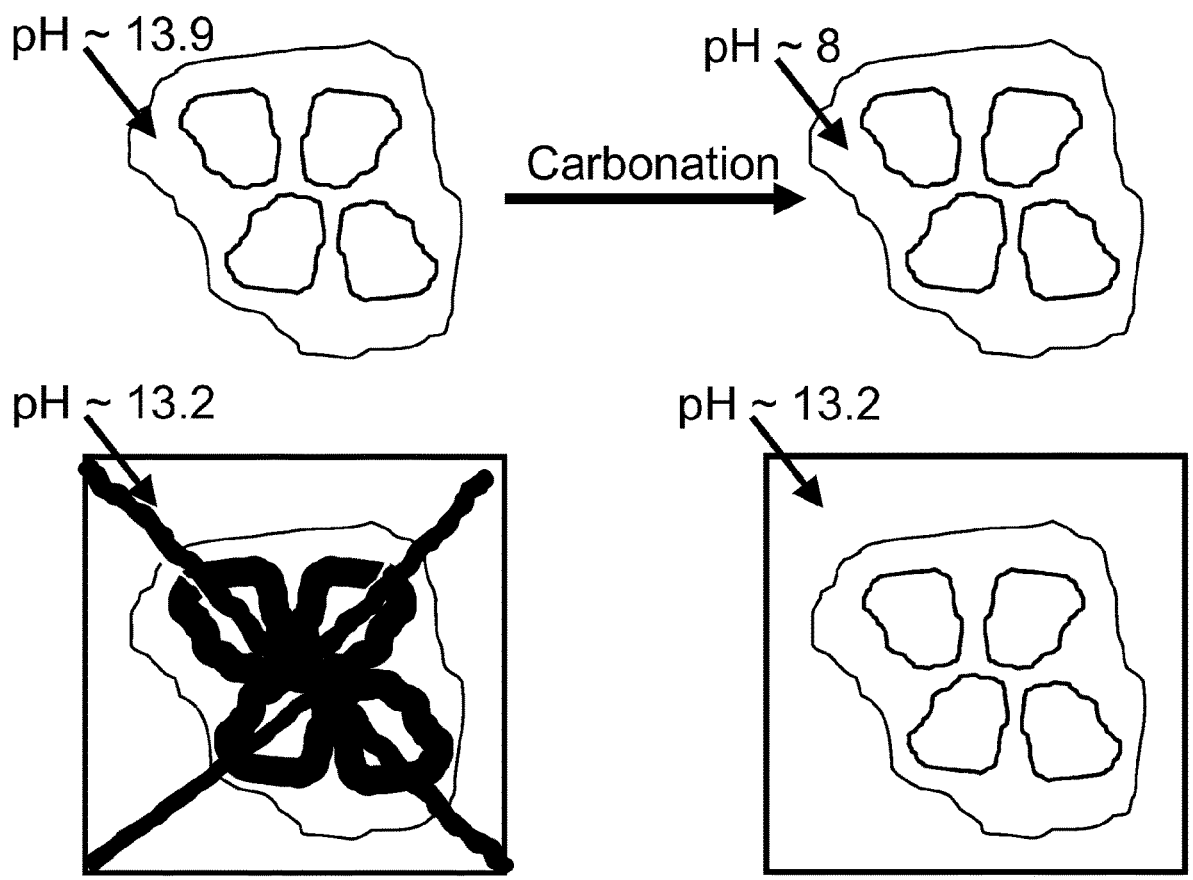
FIG. 8 shows another aspect of carbonated vs. non-carbonated recycled concrete aggregate.

In the case of the expansion and cracking observed with concrete comprising the untreated RJC aggregate and the LAFA cementing system, it is proposed that the source of alkalis required to promote ASR in the new concrete is within the RJC aggregate itself. FIG. 6 shows a schematic of the RJC (upper left) and the fresh concrete produced with the RJC (upper right). The RJC was produced with HA cement and Jobe sand, and was just 3 months old when the fresh concrete was mixed. At this age there is still considerable potential for further reaction within the RJC particles as both alkali hydroxides and reactive silica are still present. The potential for further ASR within the particles is demonstrated by the amount to expansion observed beyond 3 months in the concrete containing HA cement and virgin Jobe sand (HA-JB in FIG. 2).

Carbonating the RJC prior to use in fresh concrete will reduce the pH from somewhere in excess of 13.1 to approximately 8 and there will be insufficient alkali hydroxides within the particles to sustain ASR. Consequently, producing fresh concrete with the carbonated RJC-CO2 aggregate and a "low-alkali binder system" such as LAFA results in no expansion because there is an insufficient supply of alkali hydroxides in the system to fuel ASR despite the abundance of reactive silica (e.g. unreacted Jobe) that remains. If, however, this same aggregate (RJC-CO2) is combined with a "high-alkali binder system" such as HA cement, expansion can result as the alkali hydroxides that are present in the fresh paste can diffuse into the carbonated recycled aggregate particles and react with any remaining unreacted silica (Jobe) in these same particles.

An alternative approach to "neutralizing", by carbonation, the alkali hydroxides that remain in the original cement paste phase of the RAC particles is to "balance" the concentration of $Na_+$ and $K_+$ ions with a sufficient concentration of $Li_+$ ions. It is well-established that the expansion of concrete containing certain alkali-silica reactive aggregates can be prevented by adding a sufficient quantity of lithium. Generally, the amount of lithium required increases as the availability of sodium and potassium increase and it has been shown that establishing a lithium-to-sodium-plus-potassium-molar ratio of [Li]/[Na+K]≥0.74 is usually sufficient. The lithium-treatment of the RJC was borderline effective when the RJC-LN material was combined with the "low-alkali binder system" (LAFA). It is suspected that this treatment would be less effective if RJC-LN was combined with a "high-alkali binder system" as the value of [Li]/[Na+K] will likely be diminished. It should be noted that lithium-based admixtures are not effective in preventing ASR expansion with all types of alkali-silica reactive aggregate.

Conclusions

Recycled concrete aggregate (RCA) was produced by crushing and grading (20-5 mm) three-month-old mortars containing high-alkali cement and highly-reactive sand (Jobe). This RCA was used either without treatment (RJC) or following carbonation (RJC-CO2) or lithium-soaking (RJC-LN) to produce fresh concrete using either a high-alkali (HA) cement or a combination of low-alkali cement plus fly ash (LAFA). From the results of concrete-prism expansions tests, the following conclusions can be drawn: ASR expansion can occur when the untreated RJC is used with a "low-alkali binder system" (LAFA); ASR expansion can be prevented by carbonating the RJC (RJC-CO2) and combining it with a "low-alkali binder system" (LAFA); ASR expansion can occur with the carbonated aggregate (RJC-CO2) is combined with a "high-alkali binder system" (HA); Limited ASR expansion (0.042%) accompanied by very fine microcracks (~0.1 mm) was observed when the RJC was treated with lithium (RJC-LN) and combined with LAFA.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A method for carbonating recycled concrete aggregate (RCA) comprising
    (i) introducing carbon dioxide to a container comprising RCA, wherein carbon dioxide is introduced during grading/classification of crushed RCA;
    (ii) determining a value for one or more characteristics of the RCA, the container, or gas within the container; and
    (iii) based at least in part on the value determined in step (ii), modulating the introduction of carbon dioxide into the container,
    whereby the RCA is carbonated to produce carbonated RCA.

2. The method of claim 1 wherein the one or more characteristics comprise one or more of pressure of gas within the container, temperature of the RCA, the container, and/or gas within the container, concentration of carbon dioxide within and/or in proximity to the container, duration and flow rate for introducing carbon dioxide into the container, and/or humidity in the container.

3. The method of claim 2 wherein the characteristic comprises concentration of carbon dioxide within and/or in proximity to the container.

4. The method of claim 2 wherein the one or more characteristics comprises temperature of the RCA, the container, and/or gas within the container.

5. The method of claim 4 wherein the temperature comprises temperature of the container.

6. The method of claim 1 wherein at least a portion of the one or more characteristics is determined by a sensor operably connected to a processor, wherein the sensor and/or processor determines one or values for the one or more characteristics.

7. The method of claim 6 wherein the processor determines whether or not the one or more values are within a predetermined range or ranges for the one or more values and, if the value or values are outside the range, outputs a signal or signals to one or more actuators to modulate the introduction of carbon dioxide into the container.

8. The method of claim 1 wherein the RCA is agitated during some or all of the introduction of carbon dioxide into the container.

9. The method of claim 1 wherein carbon dioxide is introduced into a first container during or immediately after crushing the RCA.

10. The method of claim 1 wherein carbon dioxide is introduced after grading/classification of crushed RCA.

11. The method of claim 1 wherein the carbon dioxide is a mixture of gaseous and solid carbon dioxide.

12. The method of claim 1 wherein the carbonated RCA is carbonated to a level of 0.05-5% carbon dioxide, w/w.

13. The method of claim 1 wherein some or all of the carbon dioxide is obtained from flue gas of a cement producing facility or is produced by direct air capture of carbon dioxide.

14. A method for carbonating recycled concrete aggregate (RCA) comprising
    (i) introducing carbon dioxide to a container comprising RCA, wherein the carbon dioxide is a mixture of gaseous and solid carbon dioxide;
    (ii) determining a value for one or more characteristics of the RCA, the container, or gas within the container; and
    (iii) based at least in part on the value determined in step (ii), modulating the introduction of carbon dioxide into the container, whereby the RCA is carbonated to produce carbonated RCA.

15. The method of claim 14 wherein the one or more characteristics comprise one or more of pressure of gas within the container, temperature of the RCA, the container, and/or gas within the container, concentration of carbon dioxide within and/or in proximity to the container, duration and flow rate for introducing carbon dioxide into the container, and/or humidity in the container.

16. The method of claim 15 wherein the characteristic comprises concentration of carbon dioxide within and/or in proximity to the container.

17. The method of claim 15 wherein the one or more characteristics comprises temperature of the RCA, the container, and/or gas within the container.

18. The method of claim 17 wherein the temperature comprises temperature of the container.

19. The method of claim 14 wherein at least a portion of the one or more characteristics is determined by a sensor operably connected to a processor, wherein the sensor and/or processor determines one or values for the one or more characteristics.

20. The method of claim 19 wherein the processor determines whether or not the one or more values are within a predetermined range or ranges for the one or more values and, if the value or values are outside the range, outputs a signal or signals to one or more actuators to modulate the introduction of carbon dioxide into the container.

21. The method of claim 14 wherein the RCA is agitated during some or all of the introduction of carbon dioxide into the container.

22. The method of claim 14 wherein carbon dioxide is introduced into a first container during or immediately after crushing the RCA.

23. The method of claim 14 wherein carbon dioxide is introduced during grading/classification of crushed RCA.

24. The method of claim 14 wherein carbon dioxide is introduced after grading/classification of crushed RCA.

25. The method of claim 14 wherein the carbonated RCA is carbonated to a level of 0.05-5% carbon dioxide, w/w.

26. The method of claim 14 wherein some or all of the carbon dioxide is obtained from flue gas of a cement producing facility or is produced by direct air capture of carbon dioxide.

* * * * *